United States Patent
Kono et al.

(10) Patent No.: US 10,670,305 B2
(45) Date of Patent: Jun. 2, 2020

(54) REFRIGERATION APPARATUS AND METHOD FOR CONTROLLING THE SAME

(71) Applicant: Mitsubishi Electric Corporation, Tokyo (JP)

(72) Inventors: Ryuichiro Kono, Tokyo (JP); Masahiko Nakagawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 64 days.

(21) Appl. No.: 16/076,405

(22) PCT Filed: Apr. 11, 2016

(86) PCT No.: PCT/JP2016/061663
§ 371 (c)(1),
(2) Date: Aug. 8, 2018

(87) PCT Pub. No.: WO2017/179088
PCT Pub. Date: Oct. 19, 2017

(65) Prior Publication Data
US 2019/0041099 A1    Feb. 7, 2019

(51) Int. Cl.
*F25B 1/00*    (2006.01)
*F25B 11/00*   (2006.01)
(Continued)

(52) U.S. Cl.
CPC .............. *F25B 1/005* (2013.01); *F25B 11/00* (2013.01); *F25B 49/02* (2013.01); *F25D 29/005* (2013.01);
(Continued)

(58) Field of Classification Search
CPC ................................ F25B 11/00; F25B 1/005
(Continued)

(56) References Cited

U.S. PATENT DOCUMENTS

| | | | | |
|---|---|---|---|---|
| 4,478,051 A | * | 10/1984 | Ibrahim | F25B 41/062 165/279 |
| 6,883,339 B2 | * | 4/2005 | Park | F25D 11/022 62/180 |
| 2012/0326064 A1 | * | 12/2012 | Sanuki | F25B 41/062 251/129.15 |
| 2015/0027151 A1 | * | 1/2015 | Cur | F24F 1/0003 62/117 |

(Continued)

FOREIGN PATENT DOCUMENTS

| | | |
|---|---|---|
| JP | 2002-089454 A | 3/2002 |
| JP | 2005-030679 A | 2/2005 |

(Continued)

OTHER PUBLICATIONS

International Search Report of the International Searching Authority dated Jun. 21, 2016 for the corresponding international application No. PCT/JP2016/061663 (and English translation).

*Primary Examiner* — Henry T Crenshaw
(74) *Attorney, Agent, or Firm* — Posz Law Group, PLC

(57) ABSTRACT

A refrigeration apparatus has a refrigerant circuit formed by connecting a compressor, a condenser, an expansion valve, and an evaporator by a refrigerant pipe. The refrigeration apparatus includes a temperature duration time measuring unit, and a target evaporation temperature calculating unit. The temperature duration time measuring unit measures a high-temperature duration time in a thermo-off state, the high-temperature duration time being time during which the temperature of the interior of a to-be-cooled space is higher than a lowering threshold which is set with reference to a target interior temperature. The target evaporation temperature calculating unit updates the target evaporation temperature by decreasing the target evaporation temperature by a set subtraction coefficient, after the high-temperature duration time becomes greater than or equal to an update reference time.

11 Claims, 10 Drawing Sheets

(51) Int. Cl.
*F25B 49/02* (2006.01)
*F25D 29/00* (2006.01)
*F25B 9/00* (2006.01)
*F25B 41/06* (2006.01)

(52) U.S. Cl.
CPC ............ *F25B 9/002* (2013.01); *F25B 41/062* (2013.01); *F25B 2400/22* (2013.01); *F25B 2500/19* (2013.01); *F25B 2600/01* (2013.01); *F25B 2600/0253* (2013.01); *F25B 2600/111* (2013.01); *F25B 2600/21* (2013.01); *F25B 2700/2104* (2013.01); *F25B 2700/2117* (2013.01)

(58) Field of Classification Search
USPC .......................................................... 62/161
See application file for complete search history.

(56) References Cited

U.S. PATENT DOCUMENTS

2015/0285530 A1* 10/2015 Honda .................... F24F 11/89
62/216
2015/0330688 A1* 11/2015 Goel ..................... F25B 49/022
62/115
2016/0272049 A1* 9/2016 Renken .................. F25B 49/02

FOREIGN PATENT DOCUMENTS

| JP | 3668750 B2 | 4/2005 |
| JP | 2009-121787 A | 6/2009 |
| JP | 4730318 B2 | 4/2011 |

* cited by examiner

REFRIGERATION APPARATUS AND METHOD FOR CONTROLLING THE SAME

CROSS REFERENCE TO RELATED APPLICATION

This application is a U.S. national stage application of International Application No. PCT/JP2016/061663, filed on Apr. 11, 2016, the contents of which are incorporated herein by reference.

TECHNICAL FIELD

The present invention relates to a refrigeration apparatus which cools air in a to-be-cooled space, and a method for controlling the refrigeration apparatus.

BACKGROUND

Refrigeration apparatuses each includes an outdoor unit such as a condensing unit, and an indoor unit installed in a to-be-cooled space such as a cooler or a showcase. In general, the outdoor unit includes a compressor and a condenser, and the indoor unit includes an expansion valve and an evaporator. That is, in the refrigeration apparatuses, the compressor, the condenser, the expansion valve and the evaporator are connected by refrigerant pipes to form a refrigerant circuit.

Generally, in a refrigeration apparatus, an outdoor unit and an indoor unit are selected separately. To be more specific, for a refrigeration apparatus, outdoor and indoor units manufactured by different manufacturers are selected separately and used in combination. Furthermore, there can be a plurality of combinations of outdoor and indoor units. For example, a given outdoor unit can be combined with each of a plurality of indoor units manufactured by different manufacturers. Specifically, an outdoor unit may be combined with an indoor unit manufactured by a given manufacturer, or may be combined with an indoor unit manufactured by another manufacturer. Thus, in order to ensure that whatever indoor unit is combined with the outdoor unit, they can be handled, the outdoor unit needs to be independently controllable regardless of what indoor unit is combined with the outdoor unit.

As an example of independent control by the outdoor unit, the following independent control is present: the operation frequency of a compressor and the rotation speed of a fan which sends air to a condenser are changed such that an evaporation temperature obtained by subjecting a suction pressure detected by the outdoor unit to saturation conversion is set to a target evaporation temperature set to a fixed value which is lower than, for example, a target interior temperature by 10 degrees C. However, in a control to be performed, with the target evaporation temperature set to the fixed value, it is not possible to set an appropriate target evaporation temperature in accordance with a load variation in the to-be-cooled space. Consequently, even when a load is low, the operation frequency of the compressor unnecessarily rises.

As an apparatus which solves the above problem, conventionally, a refrigeration apparatus in which setting of a target evaporation temperature in an outdoor unit is variable is known. In such a refrigeration apparatus, a controller of the outdoor unit obtains, using a communication unit, information indicating a load state of an indoor-unit side, and changes the setting of the target evaporation temperature based on the obtained information. Furthermore, in other known refrigeration apparatuses, a controller of an outdoor unit obtains a target evaporation temperature calculated based on a load state of an indoor-unit side, and performs updating based on the obtained target evaporation temperature (see, for example, patent literatures 1 to 5).

Patent literatures 1 and 2 each disclose a method for setting a target evaporation temperature based on the difference between an interior temperature and a target interior temperature. Patent literature 3 discloses a method for setting a target evaporation temperature based on the difference between a target interior temperature and an interior temperature and the difference between a target evaporation temperature and an evaporation temperature. Patent literature 4 discloses a method for correcting a target evaporation temperature based on an interior temperature gradient. Patent Literature 5 discloses a method for adjusting a target evaporation temperature based on wetness of sucked refrigerant.

PATENT LITERATURE

Patent Literature 1: Japanese Unexamined Patent Application Publication No. 2005-30679
Patent Literature 2: Japanese Unexamined Patent Application Publication No. 2009-121787
Patent Literature 3: Japanese Patent No. 3668750
Patent Literature 4: Japanese Unexamined Patent Application Publication No. 2002-89454
Patent Literature 5: Japanese Patent No. 4730318

In conventional refrigeration apparatuses, a target evaporation temperature is constantly updated regardless of an operation condition and an operation state, such as whether a thermo-on state or a thermos-off state is entered and whether a defrost operation is performed or not. Thus, under a state in which the interior temperature is high, for example, just after switching from the thermos-off operation to the thermo-on operation or just after ending of the defrost operation, a controller of an outdoor unit determines that an interior load is great, and the target evaporation temperature is thus lowered more than necessary. Accordingly, the cooling capacity of the refrigeration apparatus is increased. Thus, the time required until the thermos-off operation is performed, that is, the time required unit it is determined that that the interior temperature is low and the interior load is small, is shortened. Consequently, the thermos-off state is entered before the target evaporation temperature rises to an optimum value, as a result of which the target evaporation temperature is set to a rather low value. In other words, in the conventional refrigeration apparatuses, the target evaporation temperature tends to more easily lower and not to easily rise, and the target evaporation temperature is thus set to a rather low value. Consequently, the operation frequency of the compressor is increased more than necessary, and the power consumption is increased.

SUMMARY

The present invention has been made to solve the above problems, and an object of the present invention is to provide a refrigeration apparatus which reduces unnecessarily decreasing of a target evaporation temperature, and achieves reduction of power consumption, and also a method for controlling the refrigeration apparatus.

A refrigeration apparatus according to an embodiment of the present invention includes a refrigerant circuit formed by connecting a compressor, a condenser, an expansion valve and an evaporator with refrigerant pipes. The refrigeration apparatus includes a target evaporation temperature calculating unit which calculates and updates a target evaporation temperature, the target evaporation temperature being a temperature which the temperature of the evaporator is to be made to reach, and a temperature duration time measuring unit which measures a high-temperature duration time in a thermo-on state, the high-temperature duration time being time during which the temperature of the interior of a to-be-cooled space is higher than a lowering threshold which is set with reference to a target interior temperature. The target evaporation temperature calculating unit updates the target evaporation temperature by lowering the target evaporation temperature by a set subtraction coefficient, after the high-temperature duration time measured by the temperature duration time measuring unit becomes greater than or equal to an update reference time.

A method for a controlling the refrigeration apparatus, according to the embodiment of the present invention, the refrigeration apparatus including the refrigerant circuit formed by connecting the compressor, the condenser, the expansion valve and the evaporator with the refrigerant pipes, causes a controller which controls operation of the refrigeration apparatus, to execute measurement of the high-temperature duration time in the thermo-on state, the high-temperature duration time being time during which the temperature of the interior of the to-be-cooled space is higher than the lowering threshold which is set with reference to the target interior temperature; and updating of the target evaporation temperature by lowering the target evaporation temperature by the set subtraction coefficient, after the measured high-temperature duration time becomes greater than or equal to the update reference time, the target evaporation temperature being the temperature which the temperature of the evaporator is to be made to reach.

According to an embodiment of the present invention, when the internal temperature of the to-be-cooled space is higher than a lowering threshold, if a high-temperature duration time measured by a temperature duration time measuring unit is longer than or equal to an update reference time, the target evaporation temperature calculating unit updates a target evaporation temperature by lowering it by a subtraction coefficient. Thus, the target evaporation temperature can be lowered after a time lag from the time when the turn-on state is entered. It is therefore possible to prevent the target evaporation temperature from being unnecessarily lowered, and achieve reduction of the power consumption.

DETAILED DESCRIPTION

Embodiment

Figure 1:
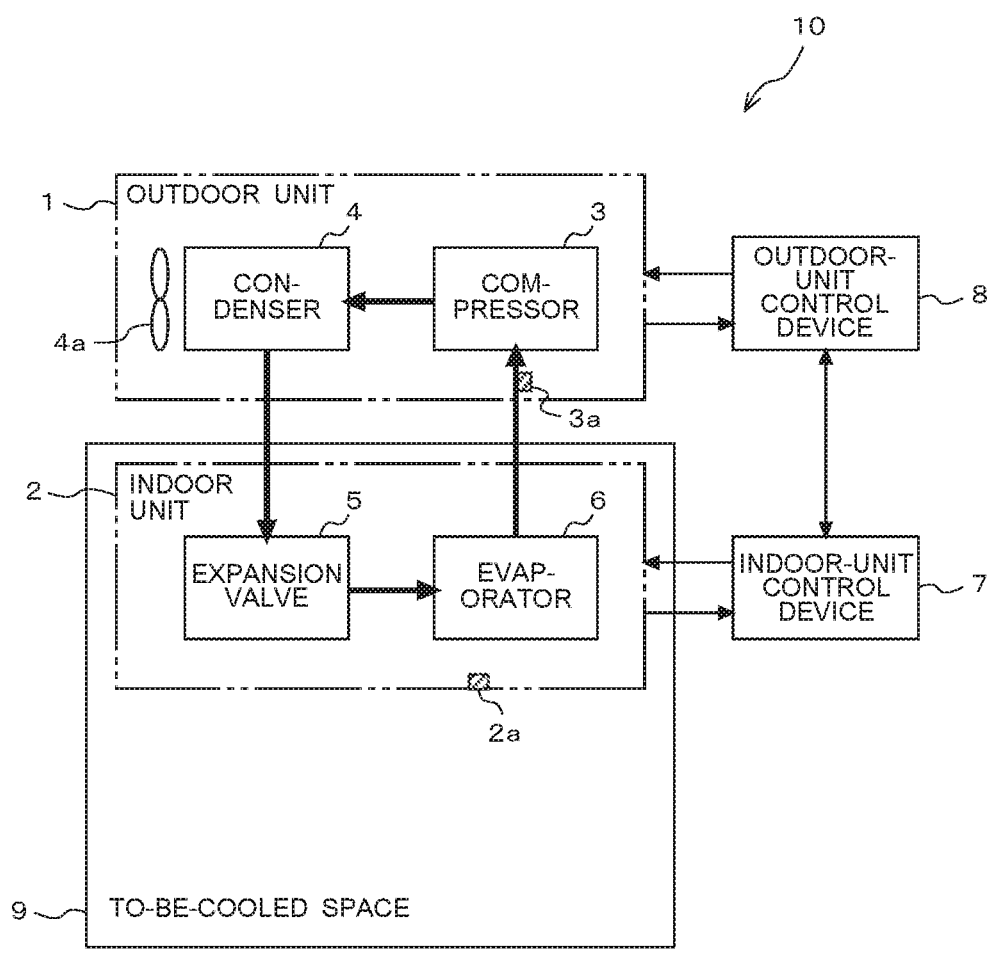
FIG. 1 is a block diagram illustrating a configuration of a refrigeration apparatus according to an embodiment of the present invention.

FIG. 1 is a block diagram illustrating a configuration of a refrigeration apparatus according to an embodiment of the present invention. As illustrated in FIG. 1, a refrigeration apparatus 10 includes an outdoor unit 1, an indoor unit 2, an indoor-unit control device 7 and an outdoor-unit control device 8. The indoor unit 2 is installed in, for example, a to-be-cooled space 9 such as a refrigerator or a refrigerated warehouse to cool air in the to-be-cooled space 9. The to-be-cooled space 9 may be a cooler or a showcase. In the following description, the interior of the to-be-cooled space 9 where the indoor unit 2 is installed is also referred to as "interior".

The outdoor unit 1 includes a compressor 3 which compresses refrigerant, and a condenser 4 which cools and condenses the refrigerant compressed by the compressor 3. The indoor unit 2 includes an expansion valve 5 which causes the refrigerant condensed by the condenser 4 to be reduced in pressure and to change into a low-temperature liquid refrigerant, and an evaporator 6 which causes the low-temperature liquid refrigerant reduced in pressure by the expansion valve 5 to evaporate to thereby perform cooling. That is, in the refrigeration apparatus 10, the compressor 3, the condenser 4, the expansion valve 5 and the evaporator 6 are connected by refrigerant pipes to form a refrigerant circuit.

The compressor 3 is an inverter compressor whose rotation speed can be adjusted by an inverter in response to an instruction from the outdoor-unit control device 8. The condenser 4 is made of, for example, a fin-and-tube heat exchanger, and performs heat exchange between outside air and refrigerant. The expansion valve 5 is made of, for example, an electronic expansion valve, and reduces the pressure of refrigerant. The evaporator 6 is made of, for example, a fin-and-tube heat exchanger, and performs heat exchange between air in the interior and refrigerant.

The outdoor unit 1 includes a suction pressure sensor 3a which is provided close to a suction portion of the compressor 3 to detect the pressure of refrigerant sucked into the compressor 3, and a fan 4a which sends air to the condenser 4. The indoor unit 2 includes an interior temperature sensor 2a which detects an interior temperature RT as information indicating the temperature of the interior.

The indoor-unit control device 7 controls the indoor unit 2. The indoor-unit control device 7 determines whether to perform the thermos-on operation or the thermos-off operation, based on the interior temperature RT detected by the interior temperature sensor 2a. Further, the indoor-unit control device 7 starts an update control of a target evaporation temperature ETm at the timing when it determines to perform the thermos-on operation, and ends the update control of the target evaporation temperature ETm at the timing when it determines to perform the thermos-off operation. In addition, if an electronic expansion valve is employed as the expansion valve 5, the indoor-unit control device 7 is made to have a function of setting the opening degree of the expansion valve 5.

The outdoor-unit control device 8 controls the outdoor unit 1. The outdoor-unit control device 8 has a function of controlling the operation frequency of the compressor 3, and a function of controlling the rotation speed of the fan 4a which sends air to the condenser 4. The indoor-unit control device 7 and the outdoor-unit control device 8 are connected to each other such that they can communicate with each other.

Figure 2:
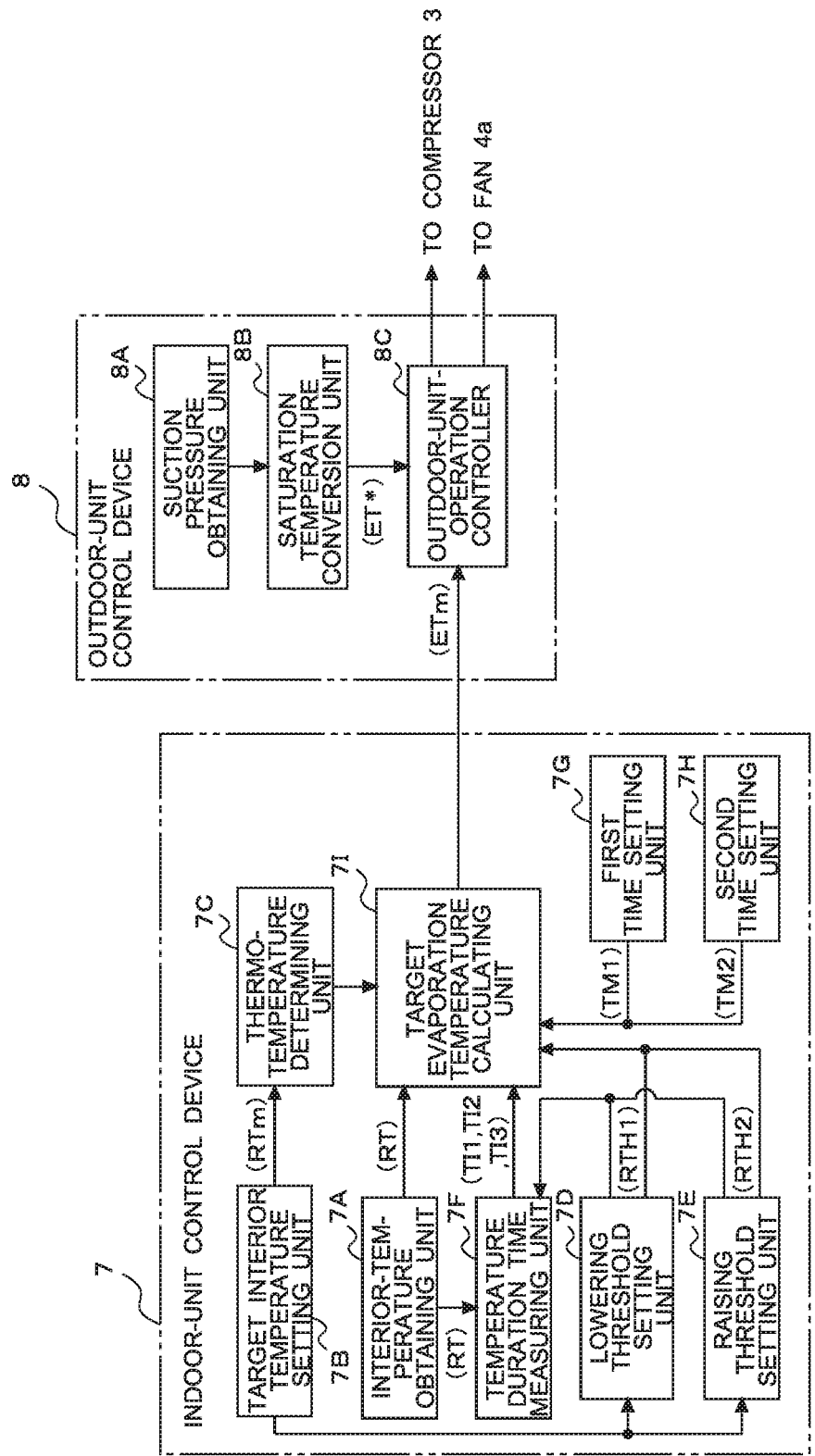
FIG. 2 is a block diagram illustrating a configuration of each of an indoor-unit control device and an outdoor-unit control device, which are included in the refrigeration apparatus as illustrated in FIG. 1.

FIG. 2 is a block diagram illustrating a configuration of each of the indoor-unit control device 7 and the outdoor-unit control device 8, which are included in the refrigeration apparatus 10. Functional configurations of the indoor-unit control device 7 and the outdoor-unit control device 8 will be described in more detail with reference to FIG. 2.

The indoor-unit control device 7 includes an interior-temperature obtaining unit 7A, a target interior temperature setting unit 7B, a thermo-temperature determining unit 7C, a lowering threshold setting unit 7D, a raising threshold setting unit 7E, a temperature duration time measuring unit 7F, a first time setting unit 7G, a second time setting unit 7H and a target evaporation temperature calculating unit 7I. The target evaporation temperature calculating unit 7I executes an update control of the target evaporation temperature ETm. The update control of the target evaporation temperature ETm includes an update process to lower the target evaporation temperature ETm and an update process to raise the target evaporation temperature ETm. Hereinafter, the update process to lower the target evaporation temperature ETm will be also referred to as "lowering update process", and the update process to raise the target evaporation temperature ETm will be also referred to as "raising update process".

The interior-temperature obtaining unit 7A obtains the detected interior temperature RT from the interior temperature sensor 2a, and outputs the obtained interior temperature RT to the temperature duration time measuring unit 7F and the target evaporation temperature calculating unit 7I.

The target interior temperature setting unit 7B sets a target interior temperature RTm. To be more specific, the target interior temperature setting unit 7B stores, as the target interior temperature RTm, a set interior temperature externally input using, for example, a remote control, in an internal memory (not illustrated) provided in the indoor-unit control device 7 or another storage. The target interior temperature setting unit 7B also has a function of outputting the set target interior temperature RTm to the thermo-temperature determining unit 7C.

The thermo-temperature determining unit 7C calculates a thermo-on temperature and a thermo-off temperature based on the target interior temperature RTm. A thermo-on temperature is a temperature based on which it can be determined with reference to the target interior temperature RTm that the load in the interior is great; that is, it is a temperature based on which the timing of starting the operation of the compressor 3 is determined. A thermo-off temperature is a temperature based on which it can be determined with reference to the target interior temperature RTm that the load in the interior is small; that is, it is a temperature based on which the timing of ending the operation of the compressor 3 is determined.

To be more specific, the thermo-temperature determining unit 7C calculates a thermo-on temperature by adding a set high-temperature-side reference temperature Ht to the target interior temperature RTm, and calculates a thermo-off temperature by subtracting a set low-temperature-side reference temperature Lt from the target interior temperature RTm. That is, the thermo-temperature determining unit 7C sets the thermo-on temperature to a temperature which is higher than the target interior temperature RTm by the high-temperature-side reference temperature Ht, and sets the thermo-off temperature to a temperature which is lower than the target interior temperature RTm by the low-temperature-side reference temperature Lt.

In the present embodiment, the high-temperature-side reference temperature Ht and the low-temperature-side reference temperature Lt are set in accordance with the target interior temperature RTm. For example, it may be set that a reference temperature table, which associates target interior temperatures RTm with high temperature-side reference temperatures Ht and with low temperature-side reference temperatures Lt, is stored in the internal memory or another storage in advance, and with respect to a given target interior temperature RTm, the thermo-temperature determining unit 7C refer to the reference temperature table to determine an associated high-temperature-side reference temperature Ht and an associated low-temperature-side reference temperature Lt. The thermo-temperature determining unit 7C also has a function of outputting the thermo-on temperature and the thermo-off temperature to the target evaporation temperature calculating unit 7I.

The lowering threshold setting unit 7D sets a lowering threshold RTH1 with reference to the target interior temperature RTm. The lowering threshold RTH1 is referred to by the target evaporation temperature calculating unit 7I to determine timing of ending a lowering update process. The lowering threshold setting unit 7D sets the lowering threshold RTH1 to a temperature lower than the thermo-on temperature. Furthermore, the lowering threshold setting unit 7D has a function of outputting the lowering threshold RTH1 to the temperature duration time measuring unit 7F and the target evaporation temperature calculating unit 7I.

The raising threshold setting unit 7E sets a raising threshold RTH2 with reference to the target interior temperature RTm. The raising threshold RTH2 is referred to by the target evaporation temperature calculating unit 7I to determine timing of starting a raising update process. The raising threshold setting unit 7E sets the raising threshold RTH2 to a temperature higher than the thermo-off temperature and lower than the lowering threshold RTH1. Furthermore, the raising threshold setting unit 7E has a function of outputting the raising threshold RTH2 to the temperature duration time measuring unit 7F and the target evaporation temperature calculating unit 7I.

With respect to the present embodiment, the following description is given on the assumption that the lowering threshold setting unit 7D sets the lowering threshold RTH1 to cause it to satisfy equation (1) below, and the raising threshold setting unit 7E sets the raising threshold RTH2 to cause it to satisfy equation (2) below.

$$RTH1 = RTm + \text{threshold setting coefficient} \quad \text{Eq. (1)}$$

$$RTH2 = RTm \quad \text{Eq. (2)}$$

The threshold setting coefficient in equation (1) indicated above is set in accordance with the target interior temperature RTm. For example, it may be set that a threshold setting table, which associates target interior temperatures RTm with threshold setting coefficients, may be stored in the internal memory or another storage in advance, and with respect to a given target interior temperature RTm, the lowering threshold setting unit 7D refers to the threshold setting table to find an associated threshold setting coefficient.

The temperature duration time measuring unit 7F compares, in the thermo-on state, the interior temperature RT output from the interior-temperature obtaining unit 7A with the lowering threshold RTH1 output from the lowering threshold setting unit 7D, and measures as a high-temperature duration time TI1, a time period during which the interior temperature RT is higher than the lowering threshold RTH1. Furthermore, the temperature duration time measuring unit 7F has a function of outputting the measured high-temperature duration time TI1 to the target evaporation temperature calculating unit 7I.

Also, the temperature duration time measuring unit 7F compares the interior temperature RT with the lowering threshold RTH1 and with the raising threshold RTH2 output from the raising threshold setting unit 7E, and measures as an intermediate-temperature duration time TI2, a time period for which the interior temperature RT falls within the range between the lowering threshold RTH1 and the raising threshold RTH2. To be more specific, the temperature duration time measuring unit 7F measures, as the intermediate-temperature duration time TI2, a time period taken until the interior temperature RT lowers from the lowering threshold RTH1 to the raising threshold RTH2. Further, the temperature duration time measuring unit 7F has a function of outputting the measured intermediate-temperature duration time TI2 to the target evaporation temperature calculating unit 7I.

The first time setting unit 7G sets an update reference time TM1, which is a reference for the timing at which the target evaporation temperature calculating unit 7I starts a lowering update process. To be more specific, the first time setting unit 7G stores an update reference time TM1 externally input using, for example, a remote control, in the internal memory or another storage. The update reference time TM1 is compared by the target evaporation temperature calculating unit 7I with the high-temperature duration time TI1 in an update control of the target evaporation temperature ETm. The update reference time TM1 is set to, for example, 10 to 15 minutes.

The second time setting unit 7H sets a load determination reference time TM2, which is a reference in determining whether the refrigeration capacity is appropriate with respect to the interior load or not. To be more specific, the second time setting unit 7H stores a load determination reference time TM2 externally input using, for example, the remote control, in the internal memory or another storage. The load determination reference time TM2 is compared by the target evaporation temperature calculating unit 7I with the intermediate-temperature duration time TI2 in the update control of the target evaporation temperature ETm. The load determination reference time TM2 is set in consideration of characteristics of the refrigerant circuit, such as the operating capacity of the compressor 3 and the to-be-cooled space 9.

It should be noted that the update reference time TM1 and the load determination reference time TM2 may be stored in advance in the internal memory or another storage, and in this case, the indoor-unit control device 7 may be configured not to include the first time setting unit 7G or the second time setting unit 7H.

The target evaporation temperature calculating unit 7I sets an initial value of the target evaporation temperature ETm such that an evaporation temperature ET* is lower than the target interior temperature RTm by a converted temperature. The converted temperature is set in accordance with, for example, the target interior temperature RTm. For example, it may be set that a conversion table, which associates target interior temperatures RTm with converted temperatures, is stored in advance in the internal memory or another storage, and with respect to a given target interior temperature RTm, the target evaporation temperature calculating unit 7I refers to the conversion table to find an associated initial value of the target evaporation temperature ETm.

It should be noted that if time required until the interior temperature RT reaches the lowering threshold RTH1 is longer than time set based on information such as the interior temperature RT and the target interior temperature RTm, it can be determined that the interior load is great with respect to the refrigeration capacity. Thus, the target evaporation temperature calculating unit 7I is configured to execute a lowering update process to lower the target evaporation temperature ETm in accordance with time required until the interior temperature RT changes from the thermo-on temperature to the lowering threshold RTH1.

The target evaporation temperature calculating unit 7I starts the lowering update process when the high-temperature duration time TI1 measured by the temperature duration time measuring unit 7F reaches the update reference time TM1. The target evaporation temperature calculating unit 7I ends the lowering update process when the interior temperature RT lowers to the lowering threshold RTH1. That is, the target evaporation temperature calculating unit 7I does not execute the lowering update process, but keeps the target evaporation temperature ETm at the current value, until the high-temperature duration time TI1 reaches the update reference time TM1. Then, the target evaporation temperature calculating unit 7I executes the lowering update process until the interior temperature RT reaches the lowering threshold RTH1 after the high-temperature duration time TI1 reaches the update reference time TM1.

To be more specific, the target evaporation temperature calculating unit 7I has a set-time measurement function of repeatedly measuring in the thermos-on state, a set time Mt which is set at intervals of, for example, 3 to 5 minutes. The set time Mt may be set to, for example, approximately ½ to ⅕ of the update reference time TM1.

Then, the target evaporation temperature calculating unit 7I updates the target evaporation temperature ETm by lowering it by a subtraction coefficient α each time the set time Mt elapses, while the temperature duration time measuring unit 7F is measuring the high-temperature duration time TI1 after the high-temperature duration time TI1 becomes greater than or equal to the update reference time TM1. That is, the target evaporation temperature calculating unit 7I subtracts the subtraction coefficient α from the target evaporation temperature ETm to set a new target evaporation temperature ETm each time the set time Mt elapses, while the interior temperature RT is above the lowering threshold RTH1 after the update reference time TM1 elapses from the time when the thermos-on state is entered. In such a manner, the target evaporation temperature calculating unit 7I executes stepwise updating of the target evaporation temperature ETm. The subtraction coefficient α is set based on information such as the target interior temperature RTm, and is set to, for example, 0.5 degrees C.

Furthermore, the target evaporation temperature calculating unit 7I starts a raising update process, if the intermediate-temperature duration time TI2 is less than the load determination reference time TM2 when the interior temperature RT lowers to the raising threshold RTH2. After starting the raising update process, the target evaporation temperature calculating unit 7I ends the raising update process when the interior temperature RT lowers to the thermo-off temperature.

It should be noted that if time required until the interior temperature RT lowers from the lowering threshold RTH1 to the raising threshold RTH2 is shorter than an expected load determination reference time TM2, it can be determined that the interior load is small with respect to the refrigeration capacity. Accordingly, if the intermediate-temperature duration time TI2 is less than the load determination reference time TM2, the target evaporation temperature calculating unit 7I updates the target evaporation temperature ETm by increasing the target evaporation temperature ETm by an addition coefficient β after the interior temperature RT reaches the raising threshold RTH2. More specifically, if the intermediate-temperature duration time TI2 is less than the load determination reference time TM2, the target evaporation temperature calculating unit 7I adds the addition coefficient β to the target evaporation temperature ETm to set a new ETm each time the set time Mt elapses, until the interior temperature RT reaches the thermo-off temperature after reaching the raising threshold RTH2. In such a manner, the target evaporation temperature calculating unit 7I executes stepwise updating of the target evaporation temperature ETm. The addition coefficient β is set based on information such as the target interior temperature RTm, and is set to, for example, 0.5 degrees C.

By contrast, if the intermediate-temperature duration time TI2 is greater than or equal to the load determination reference time TM2, the target evaporation temperature calculating unit 7I keeps the target evaporation temperature ETm at the current value, since it can be determined that the interior load is great with respect to the refrigeration capacity. Furthermore, the target evaporation temperature calculating unit 7I has a function of transmitting an initial value of the target evaporation temperature ETm or an updated value of the target evaporation temperature ETm to an outdoor-unit-operation controller 8C.

Also, the target evaporation temperature calculating unit 7I has a function of determining whether to perform the thermos-on operation or the thermos-off operation based on the interior temperature RT output from the interior-temperature obtaining unit 7A, and transmitting a result of the determination to the outdoor-unit-operation controller 8C of the outdoor-unit control device 8. That is, the target evaporation temperature calculating unit 7I has a function of transmitting, when the interior temperature RT rises to the thermo-on temperature, a drive instruction to start the operation of the compressor 3 to the outdoor-unit-operation controller 8C, and transmitting, when the interior temperature RT lowers to the thermo-off temperature, a stop instruction to stop the operation of the compressor 3 to the outdoor-unit-operation controller 8C.

The outdoor-unit control device 8 includes a suction pressure obtaining unit 8A, a saturation temperature conversion unit 8B and the outdoor-unit-operation controller 8C. The suction pressure obtaining unit 8A obtains a suction pressure of the compressor 3 which is detected by the suction pressure sensor 3a. The saturation temperature conversion unit 8B performs saturation conversion on the suction pressure obtained by the suction pressure obtaining unit 8A to determine an evaporation temperature ET*.

The outdoor-unit-operation controller 8C controls the operation frequency of the compressor 3 and the rotation speed of the fan 4a. The outdoor-unit-operation controller 8C controls the evaporation temperature ET* determined by the saturation conversion by the saturation temperature conversion unit 8B, in such a way as to make the evaporation temperature ET* closer to the target evaporation temperature ETm transmitted from the target evaporation temperature calculating unit 7I.

To be more specific, the outdoor-unit-operation controller 8C lowers the rotation speed of the compressor 3 and the rotation speed of the fan 4a if the evaporation temperature ET* is below the target evaporation temperature ETm (ET*<ETm). By contrast, the outdoor-unit-operation controller 8C raises the rotation speed of the compressor 3 and the rotation speed of the fan 4a if the evaporation temperature ET* is above the target evaporation temperature ETm (ET*>ETm).

The outdoor-unit-operation controller 8C starts the operation of the compressor 3 in response to a drive instruction output from the thermo-temperature determining unit 7C, and stops the operation of the compressor 3 in response to a stop instruction output from the thermo-temperature determining unit 7C.

In the present embodiment, the outdoor-unit-operation controller 8C executes each of the above controls with a PID control. However, the outdoor-unit-operation controller 8C may execute each of the above controls with another control method such as a fuzzy control.

Figure 3:
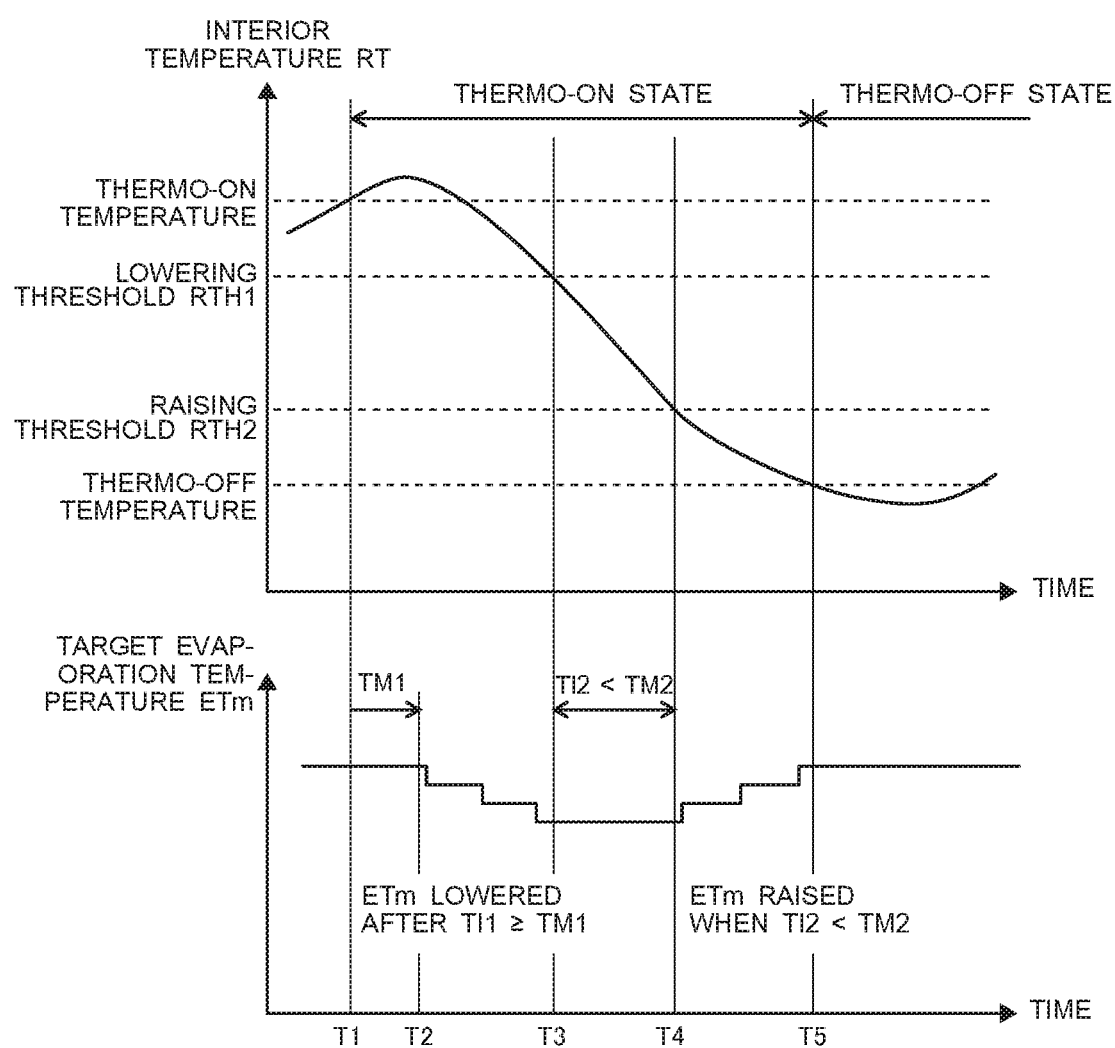
FIG. 3 is a graph illustrating changes in an interior temperature and a target evaporation temperature for the refrigeration apparatus as illustrated in FIG. 1, and an update control of the target evaporation temperature, in the case where an intermediate-temperature duration time is less than a load determination reference time.
Figure 4:
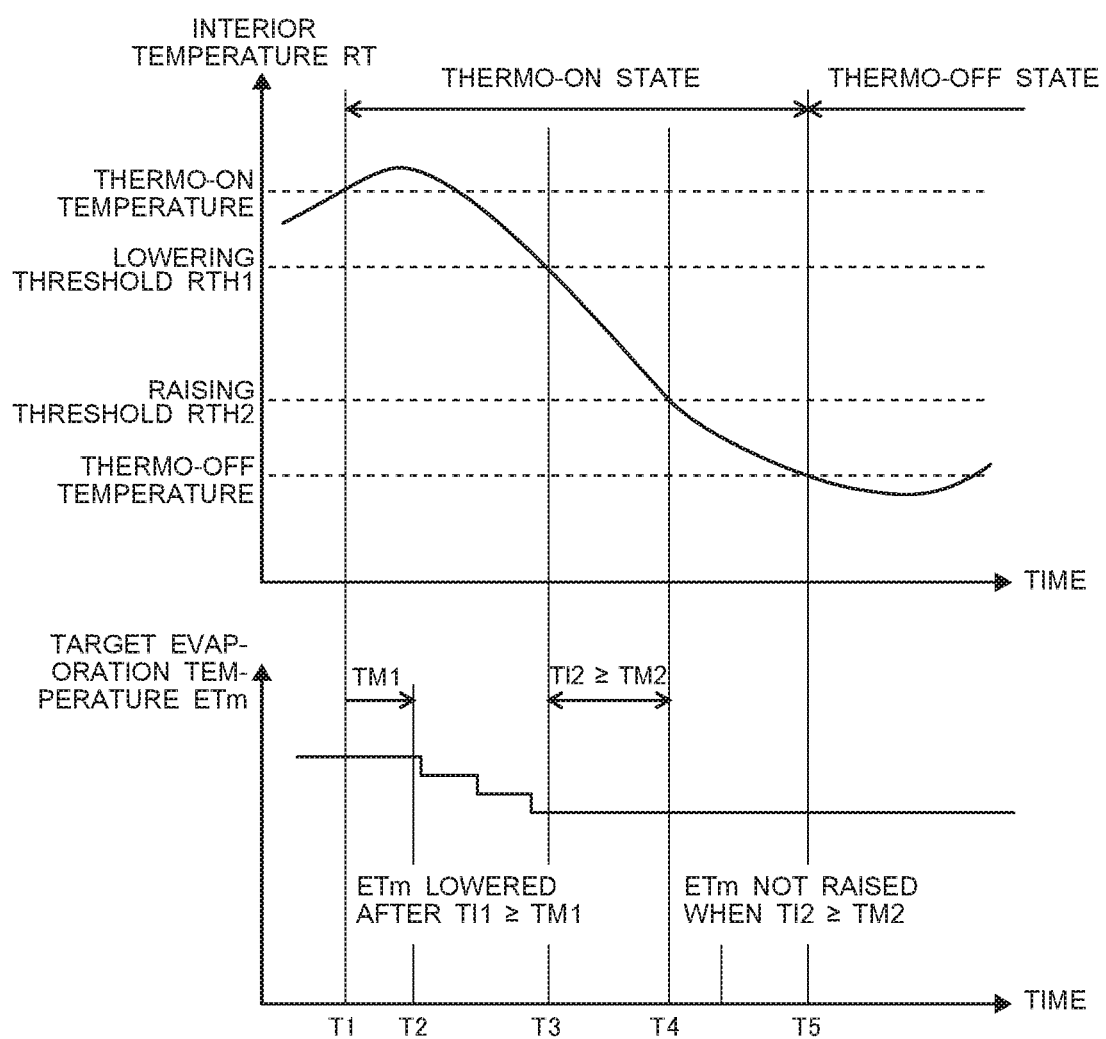
FIG. 4 is a graph illustrating changes in the interior temperature and the target evaporation temperature for the refrigeration apparatus as illustrated in FIG. 1 and the update control of the target evaporation temperature, in the case where the intermediate-temperature duration time is greater than or equal to the load determination reference time.
Figure 5:
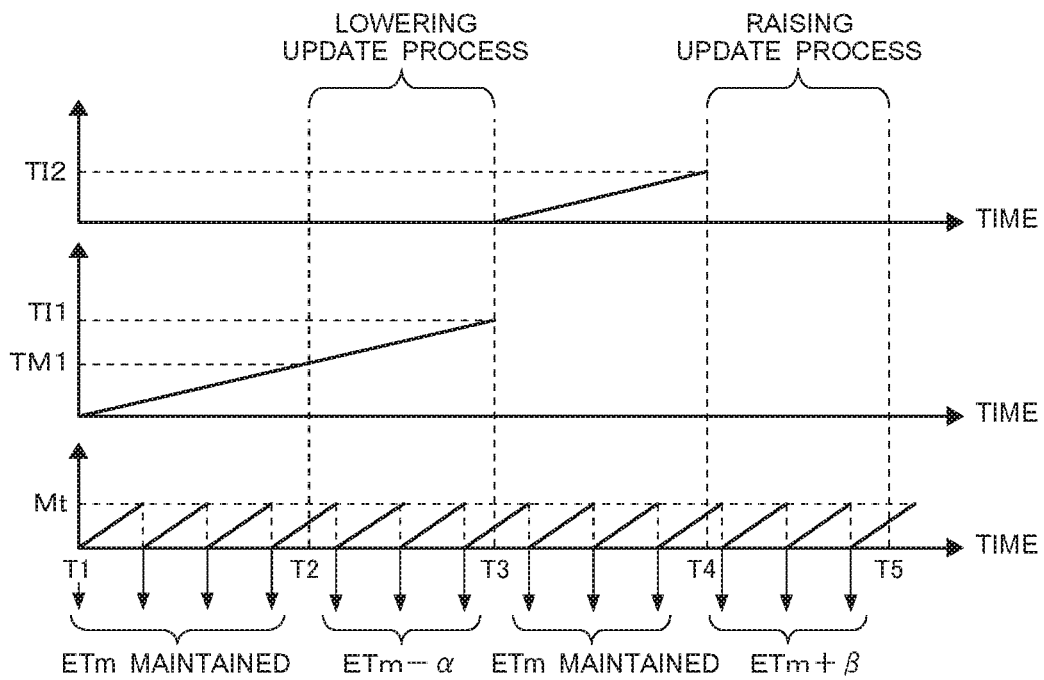
FIG. 5 is a schematic view illustrating the timing of execution of the update control of the target evaporation temperature, which is executed by a target evaporation temperature calculating unit as illustrated in FIG. 2, in the case where the intermediate-temperature duration time is less than the load determination reference time.
Figure 6:
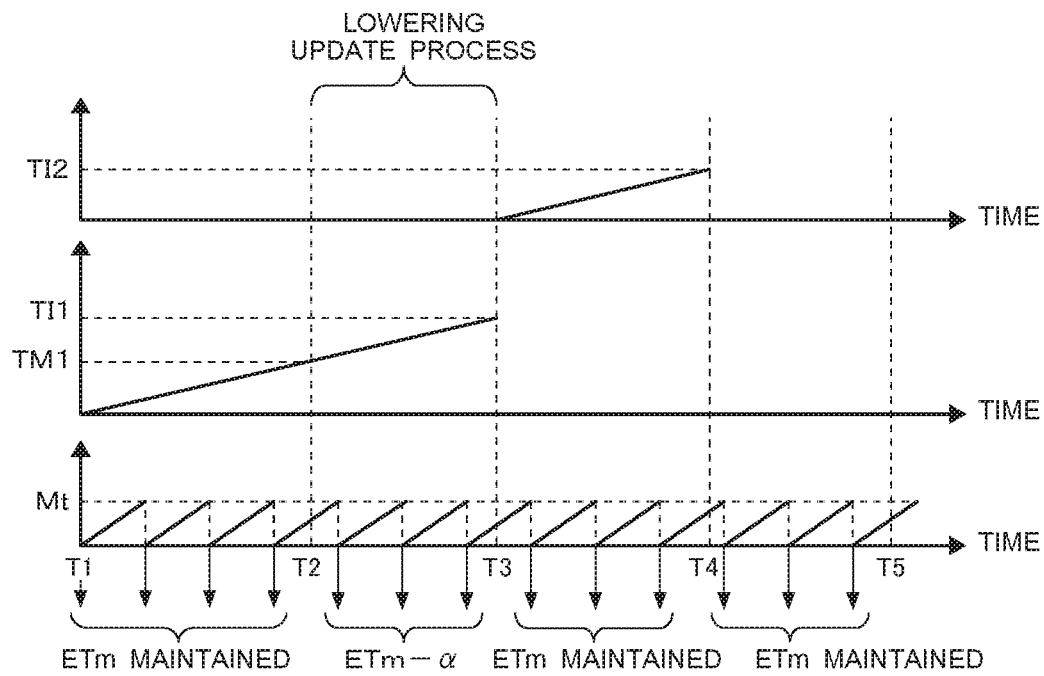
FIG. 6 is a schematic view illustrating the timing of execution of the update control of the target evaporation temperature by the target evaporation temperature calculating unit as illustrated in FIG. 2, in the case where the intermediate-temperature duration time is greater than or equal to the load determination reference time.

FIG. 3 is a graph illustrating changes in the interior temperature RT and the target evaporation temperature ETm in the refrigeration apparatus 10 as illustrated in FIG. 1 and the update control of the target evaporation temperature ETm, in the case where the intermediate-temperature duration time TI2 is less than the load determination reference time TM2. FIG. 4 is a graph illustrating changes in the interior temperature RT and the target evaporation temperature ETm in the refrigeration apparatus 10 as illustrated in FIG. 1 and the update control of the target evaporation temperature ETm, in the case where the intermediate-temperature duration time TI2 is greater than or equal to the load determination reference time TM2. FIG. 5 is a schematic view illustrating the timing of execution of the update control of the target evaporation temperature ETm, which is performed by the target evaporation temperature calculating unit 7I as illustrated in FIG. 2, in the case where the intermediate-temperature duration time TI2 is less than the load determination reference time TM2. FIG. 6 schematically illustrates the timing of execution of the update control of the target evaporation temperature ETm, which is executed by the target evaporation temperature calculating unit 7I as illustrated in FIG. 2, in the case where the intermediate-temperature duration time TI2 is greater than or equal to the load determination reference time TM2. With reference to FIGS. 3 to 6, the update control of the target evaporation temperature ETm which is executed by the target evaporation temperature calculating unit 7I will be described in more detail.

In FIGS. 3 and 4, the horizontal axis represents "time", the upper part of the vertical axis represents "interior temperature RT", and the lower part of the vertical axis represents "target evaporation temperature ETm". In FIGS. 5 and 6, the horizontal axis represents "time", the lower part of the vertical axis represents "set time Mt", the intermediate part of the vertical axis represents "high-temperature duration time TI1", and the upper part of the vertical axis represents "intermediate-temperature duration time TI2". Furthermore, referring to FIGS. 3 to 6, it is assumed that at time T1, the thermos-on state is entered, and at time T5, the thermos-off state is entered. In addition, referring to FIGS. 3 to 6, it is assumed that at time T2, the update reference time TM1 elapses, at time T3, the interior temperature RT reaches the lowering threshold RTH1, and at time T4, the interior temperature RT reaches the raising threshold RTH2.

As illustrated in FIGS. 5 and 6, the target evaporation temperature calculating unit 7I starts to repeatedly measure the set time Mt at time T1, but does not execute the update process on the target evaporation temperature ETm during the period from time T1 to time T2, that is, until the update reference time TM1 is reached.

Subsequently, the target evaporation temperature calculating unit 7I executes the lowering update process during the period from time T2 to time T3. To be more specific, when the set time Mt, which is to be repeatedly measured with the set-time measurement function, elapses for the first time after the high-temperature duration time TI1 reaches the update reference time TM1, the target evaporation temperature calculating unit 7I updates the target evaporation temperature ETm by lowering it by the subtraction coefficient $\alpha$. It should be noted that if the set time Mt is set to a 1/n (n=integer) multiple of the update reference time TM1, the target evaporation temperature calculating unit 7I updates the target evaporation temperature ETm by lowering it by the subtraction coefficient $\alpha$ when the high-temperature duration time TI1 reaches the update reference time TM1. Then, as illustrated in FIGS. 3 to 6, until time T3 at which the interior temperature RT reaches the lowering threshold RTH1, the target evaporation temperature calculating unit 7I updates the target evaporation temperature ETm by lowering it by the subtraction coefficient $\alpha$ each time the set time Mt elapses.

When time T3 is reached, as illustrated in FIGS. 3 to 6, the target evaporation temperature calculating unit 7I keeps the target evaporation temperature ETm at the current value, at least until time T4.

Subsequently, from time T4 to time T5, as illustrated in FIGS. 3 and 5, the target evaporation temperature calculating unit 7I executes the raising update control if the intermediate-temperature duration time TI2 is less than the load determination reference time TM2. More specifically, when the set time Mt, which is to be repeatedly measured with the set-time measurement function, elapses for the first time after the interior temperature RT lowers to the raising threshold RTH2, the target evaporation temperature calculating unit 7I updates the target evaporation temperature ETm by raising it by the addition coefficient $\beta$. Then, as illustrated in FIGS. 3 to 5, until time T5 at which the interior temperature RT lowers to the thermo-off temperature, the target evaporation temperature calculating unit 7I updates the target evaporation temperature ETm by raising it by the addition coefficient $\beta$ each time the set time Mt elapses.

Although FIGS. 5 and 6 each illustrate by way of example the case where the target evaporation temperature calculating unit 7I repeatedly measures the set time Mt after the thermos-on state is entered, this is not limitative, that is, other cases are also applicable. For example, the target evaporation temperature calculating unit 7I may suspend the measurement of the set time Mt when the interior temperature RT lowers to the lowering threshold RTH1, and then resume the measurement of the set time Mt when the interior temperature RT reaches the raising threshold RTH2. Furthermore, the set time Mt before the measurement is suspended and that after the measurement is resumed may be set to different times.

By contrast, from time T4 to time T5, as illustrated in FIGS. 4 and 6, the target evaporation temperature calculating unit 7I does not execute the raising update control if the intermediate-temperature duration time TI2 is greater than or equal to the load determination reference time TM2.

Each of the indoor-unit control device 7 and the outdoor-unit control device 8 can be made of hardware such as circuit devices which perform the above associated functions, or can be made as, for example, software to be executed on a microcomputer such as a DSP or on an arithmetic unit such as a CPU. In addition, the internal memory or another storage as described above can be made of a hard disk drive (HDD) or a flash memory.

The indoor-unit control device 7 may be provided in the indoor unit 2, and the outdoor-unit control device 8 may be provided in the outdoor unit 1. The refrigeration apparatus 10 may include, instead of the indoor-unit control device 7 and the outdoor-unit control device 8, a single controller having both the functions of the indoor-unit control device 7 and the outdoor-unit control device 8, that is, a single controller which controls the outdoor unit 1 and the indoor unit 2. This controller may be provided in the outdoor unit 1 or the indoor unit 2, or may be provided outside the outdoor unit 1 and the indoor unit 2.

In addition, although FIG. 1 illustrates the case where the expansion valve 5 is provided in the indoor unit 2, this is not limitative, and the expansion valve 5 may be provided in the outdoor unit 1. Although an example of the refrigeration apparatus 10 as illustrated in FIG. 1 is a separation type refrigeration apparatus in which the outdoor unit 1 and the indoor unit 2 are disposed separately from each other, this is not limitative, and the refrigeration apparatus 10 may be an integrated type refrigeration apparatus in which the internal components of the outdoor unit 1 and the internal components of the indoor unit 2 are accommodated in a single casing.

Although the above description of the embodiment refers to by way of example the case where the thermo-temperature determining unit 7C outputs the thermo-on temperature and the thermo-off temperature to the target evaporation temperature calculating unit 7I, this is not limitative, and the thermo-temperature determining unit 7C may store the thermo-on temperature and the thermo-off temperature in the internal memory or another storage. The target evaporation temperature calculating unit 7I may read the thermo-on temperature and the thermo-off temperature from the internal memory or another storage, and use the read temperatures.

Likewise, it may be set that the lowering threshold setting unit 7D stores the lowering threshold in the internal memory or the like, the raising threshold setting unit 7E stores the raising threshold in the internal memory or the like, and the temperature duration time measuring unit 7F and the target evaporation temperature calculating unit 7I read the lowering threshold and the raising threshold from the internal memory or the like, and perform the above associated functions. Furthermore, the update reference time TM1 and the load determination reference time TM2 may be stored in the internal memory or the like in advance. In this case, the target evaporation temperature calculating unit 7I reads the update reference time TM1 and the load determination reference time TM2 from the internal memory or the like, and uses the read reference times.

Furthermore, although the foregoing description of the embodiment refers to by way of example the case where the lowering threshold setting unit 7D sets the lowering threshold RTH1 based on the target interior temperature RTm, and the raising threshold setting unit 7E sets the raising threshold RTH2 based on the target interior temperature RTm, this is not limitative, and other cases are also applicable. For example, the thermo-temperature determining unit 7C may output the thermo-on temperature and the thermo-off temperature to the lowering threshold setting unit 7D and the raising threshold setting unit 7E. In this case, it may be set that for example, a lowering threshold table, which associates thermo-on temperatures with the lowering thresholds RTH1, is stored in the internal memory or another storage in advance, and with respect to a given thermos-on temperature, the lowering threshold setting unit 7D refers to the lowering threshold table to find an associated lowering threshold RTH1. Also, it may be set that for example, a raising threshold table, which associates thermo-off temperatures with raising thresholds RTH2, is stored in the internal memory or another storage in advance, and with respect to a given thermos-off temperature, the raising threshold setting unit 7E refers to the raising threshold table to find an associated raising threshold RTH2. Instead, the thermo-temperature determining unit 7C may store the thermo-on temperature and the thermo-off temperature in the internal memory or another storage, and the lowering threshold setting unit 7D and the raising threshold setting unit 7E may read the thermo-on temperature and the thermo-off temperature from the internal memory or other storage, and use the read temperatures.

Figure 7:
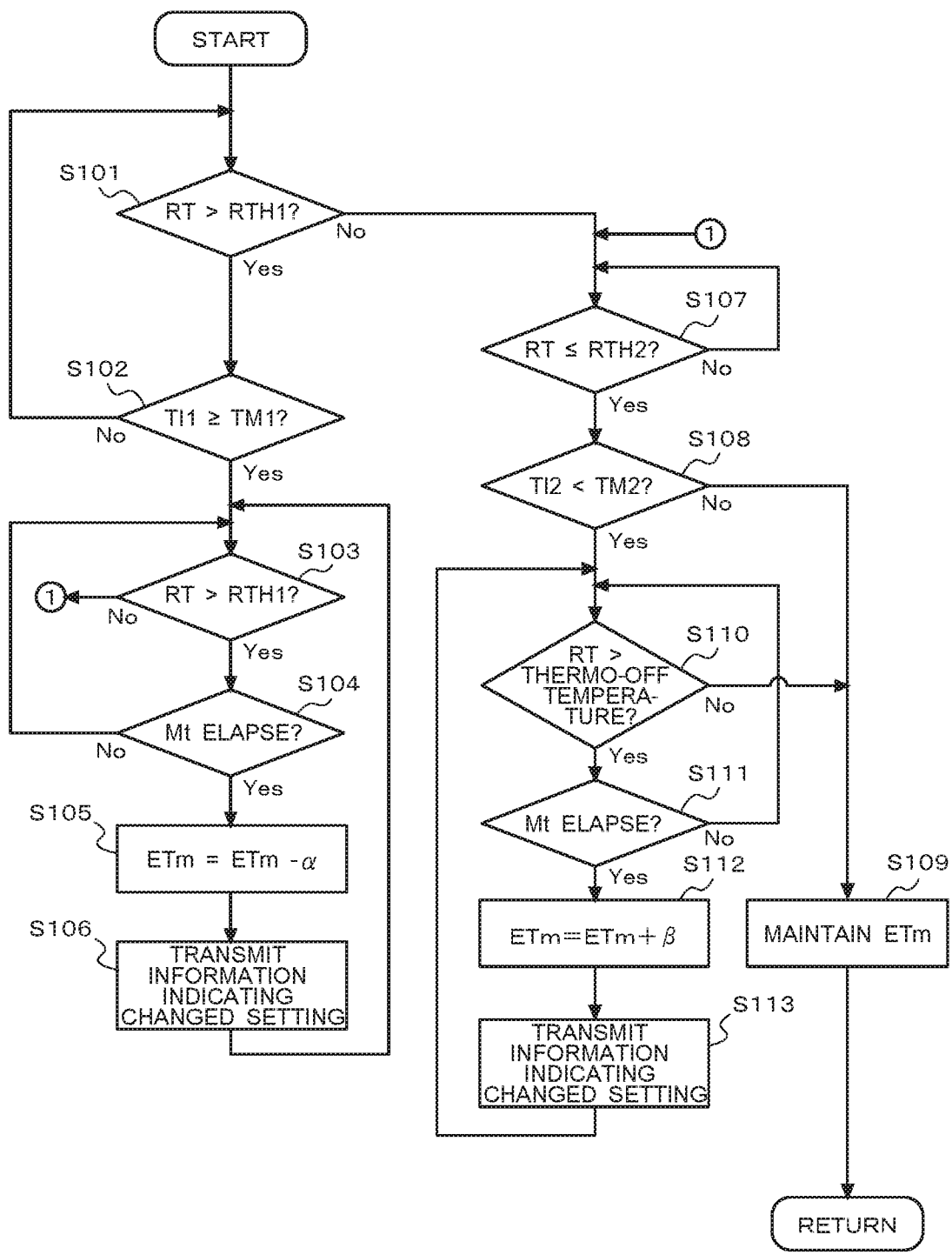
FIG. 7 is a flowchart illustrating operation of the target evaporation temperature calculating unit, which is included in the indoor-unit control device as illustrated in FIG. 2.

FIG. 7 is a flowchart illustrating the operation of the target evaporation temperature calculating unit 7I included in the indoor-unit control device 7. With reference to FIG. 7, a description will be made regarding the update control of the target evaporation temperature ETm, which is executed by the target evaporation temperature calculating unit 7I at regular intervals, and a method for controlling the refrigeration apparatus 10 with the indoor-unit control device 7.

First, in the thermo-on state, the target evaporation temperature calculating unit 7I compares the interior temperature RT with the lowering threshold RTH1, and determines whether the interior temperature RT is greater than the lowering threshold RTH1 or not (step S101 in FIG. 7). If the interior temperature RT is greater than the lowering threshold RTH1 (Yes in step S101 in FIG. 7), the target evaporation temperature calculating unit 7I compares the high-temperature duration time TI1 measured by the temperature duration time measuring unit 7F with the update reference time TM1, and waits until the high-temperature duration time TI1 becomes greater than or equal to the update reference time TM1. That is, the target evaporation temperature calculating unit 7I executes the processes of steps S101 and S102 while the high-temperature duration time TI1 is less than the update reference time TM1 (No in step S102 in FIG. 7).

Then, when the high-temperature duration time TI1 becomes greater than or equal to the update reference time TM1 (Yes in step S102 in FIG. 7), the target evaporation temperature calculating unit 7I starts a lowering update process (steps S103 to S106 in FIG. 7). That is, when the high-temperature duration time TI1 reaches the update reference time TM1, the target evaporation temperature calculating unit 7I repeatedly executes determination of whether the interior temperature RT is greater than the lowering threshold RTH1 or not (step S103 in FIG. 7), and determination of whether the set time Mt elapses or not (step S104 in FIG. 7). Then, when the set time Mt elapses for the first time (Yes in step S104 in FIG. 7), the target evaporation temperature calculating unit 7I updates the target evaporation temperature ETm by lowering it by the subtraction coefficient $\alpha$ (step S105 in FIG. 7). In this case, the target evaporation temperature calculating unit 7I transmits information indicating the updated value of the target evaporation temperature ETm to the outdoor-unit-operation controller 8C. As a result, the target evaporation temperature calculating unit 7I urges the outdoor-unit-operation controller 8C to perform control to raise the cooling capacity, that is, control to raise the operation frequency of the compressor 3 and the rotation speed of the fan 4a (step S106 in FIG. 7). Then, the target evaporation temperature calculating unit 7I returns to step S103.

That is, the target evaporation temperature calculating unit 7I executes a series of processes of step S103 to step S106 until the interior temperature RT reaches the lowering threshold RTH1, and updates the target evaporation temperature ETm in accordance with the number of times which the set time Mt is measured. When the interior temperature RT reaches the lowering threshold RTH1 (No in step S103 in FIG. 7) while the set time Mt is being measured (No in step S104 in FIG. 7), the target evaporation temperature calculating unit 7I proceeds to step S107.

When the interior temperature RT becomes less than or equal to the lowering threshold RTH1 (No in step S101 in FIG. 7) without the high-temperature duration time TI1 reaching the update reference time TM1 (No in step S102 in FIG. 7), the target evaporation temperature calculating unit 7I proceeds to step S107 without lowering the target evaporation temperature ETm.

As described above, the target evaporation temperature calculating unit 7I does not lower the target evaporation temperature ETm until the high-temperature duration time TI1 reaches the update reference time TM1. Also, the target evaporation temperature calculating unit 7I does not lower the target evaporation temperature ETm, when the interior temperature RT becomes less than or equal to the lowering threshold RTH1 without the high-temperature duration time TI1 reaching the update reference time TM1. By virtue of the above control, it is possible to prevent the target evaporation temperature from being lowered more than necessary under the following situation: it is determined that the interior load is great, because of the interior temperature is high, even though the interior load has not changed, as in a situation immediately after switching from the thermo-off state to the thermo-on state or immediately after ending of the defrost operation. As a result, the refrigeration apparatus 10 can reduce the power consumption.

Next, the target evaporation temperature calculating unit 7I compares the interior temperature RT with the raising threshold RTH2, and determines whether the interior temperature RT is less than or equal to the raising threshold RTH2 (step S107 in FIG. 7).

In this case, if the interior temperature RT is greater than the raising threshold RTH2 (No in step S107 in FIG. 7), the target evaporation temperature calculating unit 7I keeps the target evaporation temperature ETm at the current value. This is because if RTH2<RT≤RTH1, it can be determined that the refrigeration capacity and the interior load balance each other.

When the interior temperature RT lowers to the raising threshold RTH2 (Yes in step S107 in FIG. 7), the target evaporation temperature calculating unit 7I compares the intermediate-temperature duration time TI2 measured by the temperature duration time measuring unit 7F with the load evaluation reference time TM2, and determines whether the intermediate-temperature duration time TI2 is less than the load determination reference time TM2 or not (step S108 in FIG. 7).

If the intermediate-temperature duration time TI2 is greater than or equal to the load determination reference time TM2 (No in step S108 in FIG. 7), it can be determined that the refrigeration capacity is not sufficient, and thus the target evaporation temperature calculating unit 7I keeps the target evaporation temperature ETm at the current value (step S109 in FIG. 7).

If the intermediate-temperature duration time TI2 is less than the load determination reference time TM2 (Yes in step S108 in FIG. 7), it can be determined which the refrigeration capacity is sufficient, and thus the target evaporation temperature calculating unit 7I starts a raising update process (FIG. 7: step S110 to S113). That is, after the interior temperature RT lowers to the raising threshold RTH2, the target evaporation temperature calculating unit 7I repeatedly executes determination of whether the interior temperature RT is greater than the thermo-off temperature or not (step S110 in FIG. 7) and determination of whether the set time Mt elapses (step S111 in FIG. 7). Then, when the set time Mt elapses for the first time (Yes in step S111 in FIG. 7), the target evaporation temperature calculating unit 7I updates the target evaporation temperature ETm by raising it by the addition coefficient β (step S112 in FIG. 7). In this case, the target evaporation temperature calculating unit 7I transmits information indicating the updated value of the target evaporation temperature ETm to the outdoor-unit-operation controller 8C. As a result, the target evaporation temperature calculating unit 7I urges the outdoor-unit-operation controller 8C to perform control to lower the cooling capacity, that is, control to lower the operation frequency of the compressor 3 and the rotation speed of the fan 4a. Also, it is possible to prevent the interior temperature RT from being unnecessarily lowered, and thus reduce the power consumption (step S113 in FIG. 7).

The target evaporation temperature calculating unit 7I executes a series of processes of step S110 to step S113 until the interior temperature RT reaches the thermo-off temperature, and updates the target evaporation temperature ETm in accordance with the number of times which the set time Mt is measured.

When the interior temperature RT reaches the thermo-off temperature (No in step S110 in FIG. 7) while the set time Mt is being measured (No in step S111 in FIG. 7), the target evaporation temperature calculating unit 7I ends the raising update process, and keeps the target evaporation temperature ETm at the current value (step S109 in FIG. 7).

As described above, even when the load determination reference time TM2 elapses, if the intermediate-temperature duration time TI2 is greater than or equal to the load determination reference time TM2, the answer to the question in step S108 is "No", and thus the target evaporation temperature calculating unit 7I does not raise the target evaporation temperature ETm. In such a manner, only when it can be determined that the refrigeration capacity is sufficient, the target evaporation temperature calculating unit 7I controls the target evaporation temperature ETm to be raised, and when it cannot be determined that the refrigeration capacity is sufficient, the target evaporation temperature calculating unit 7I controls the current target evaporation temperature ETm to be maintained. That is, even in the case where even though the interior temperature RT is low, the refrigeration capacity is not sufficient, and the target evaporation temperature ETm is thus required to be kept at the current value, the refrigeration apparatus 10 appropriately makes a determination using the load determination reference time TM2. Thus, the refrigeration apparatus 10 can prevent the target evaporation temperature ETm from being unnecessarily raised, and prevent shortage of the cooling capacity.

The temperature duration time measuring unit 7F carries out a high-temperature duration time measuring step and an intermediate-temperature duration time measuring step in parallel with the update control of the target evaporation temperature ETm which is executed by the target evaporation temperature calculating unit 7I. A high-temperature duration time measuring step is a step of measuring, as the high-temperature duration time TI1, a time period in which the temperature of the interior of the to-be-cooled space 9 is higher than the lowering threshold RTH1 in the thermo-on state. An intermediate-temperature duration time measuring step is a step of measuring, as the intermediate-temperature duration time TI2, a time period required until the interior temperature RT lowers from the lowering threshold RTH1 to the raising threshold RTH2.

Figure 8:
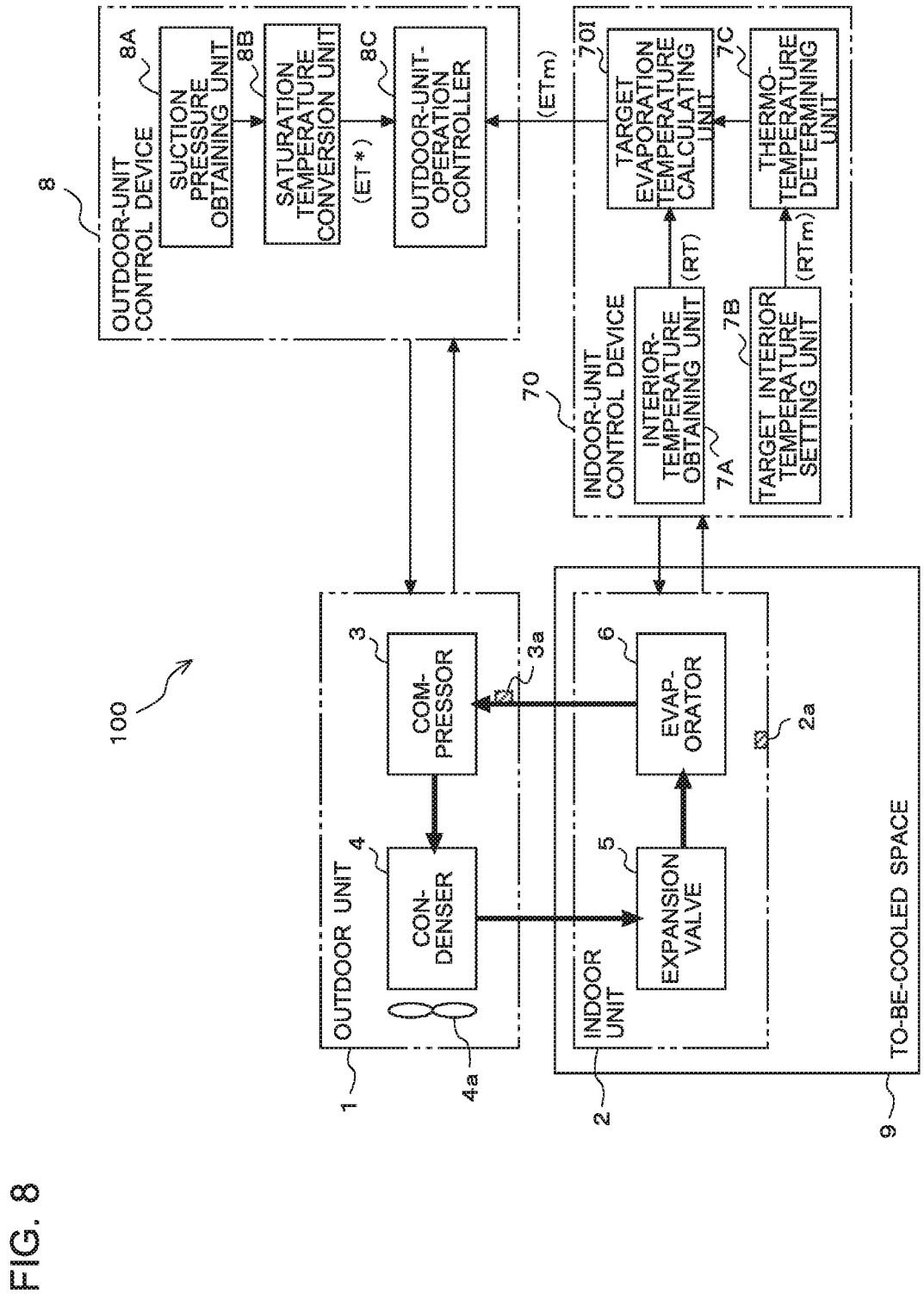
FIG. 8 is a block diagram illustrating a configuration of a conventional refrigeration apparatus, i.e., a refrigeration apparatus of related art.
Figure 9:
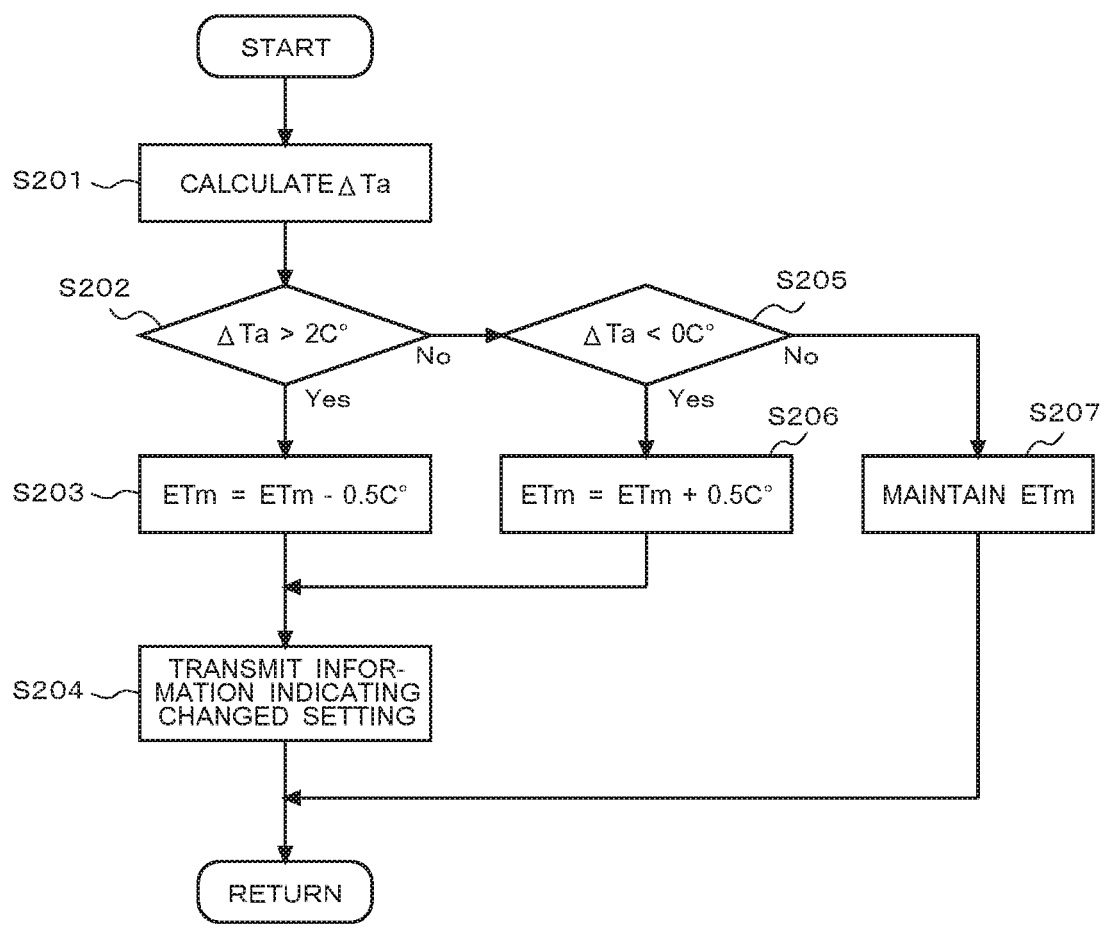
FIG. 9 is a flowchart illustrating operation of a target evaporation temperature calculating unit, which is included in an indoor-unit control device as illustrated in FIG. 8.
Figure 10:
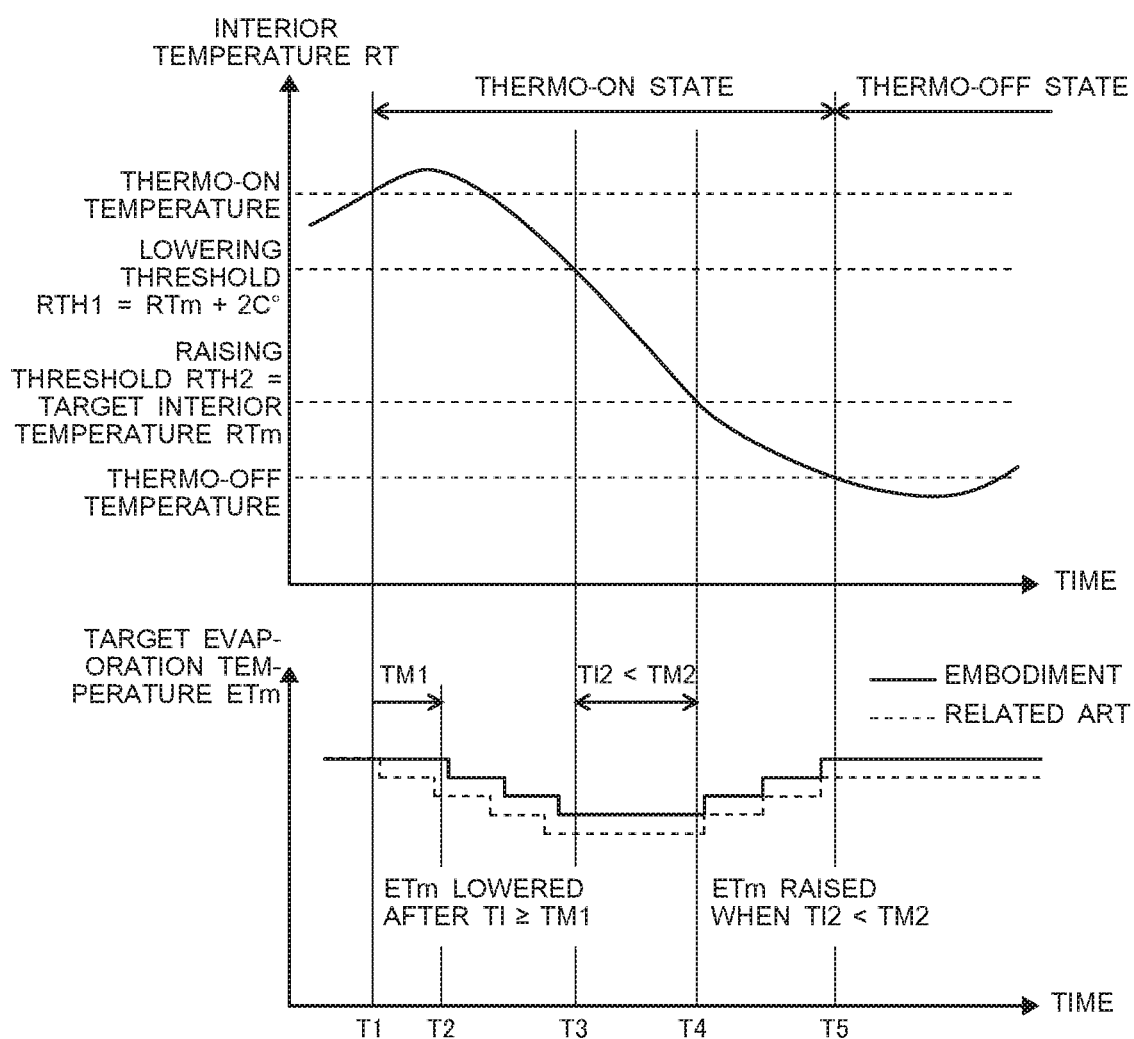
FIG. 10 is a graph illustrating an example of changes in the interior temperatures and target evaporation temperatures for the refrigeration apparatus according to the embodiment of the present invention and the conventional refrigeration apparatus.
Figure 11:
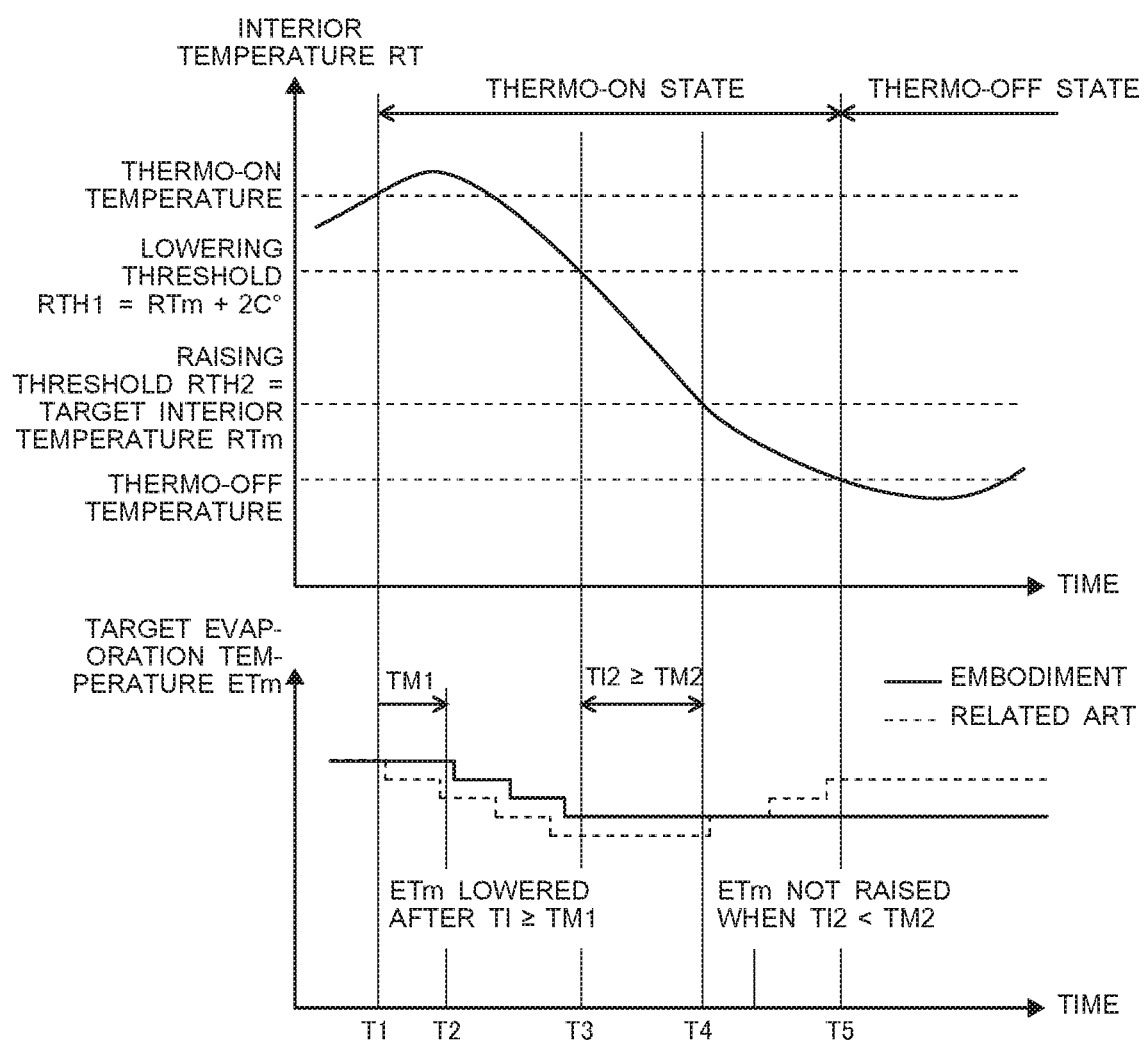
FIG. 11 is a graph illustrating another example of the changes in the interior temperatures and target evaporation temperatures for the refrigeration apparatus according to the embodiment of the present invention and the conventional refrigeration apparatus.

Advantages obtained by the refrigeration apparatus 10 will be described in detail with reference to FIGS. 8 to 11. FIG. 8 is a block diagram illustrating the configuration of a conventional refrigeration apparatus, i.e., a refrigeration apparatus of related art. FIG. 9 is a flowchart illustrating operation of the target evaporation temperature calculating unit included in the indoor-unit control device as illustrated in FIG. 8. FIG. 10 is a graph illustrating an example of changes in the interior temperature and the target evaporation temperature in each of the refrigeration apparatus according to the embodiment of the present invention and the conventional refrigeration apparatus. FIG. 11 is a graph illustrating another example of changes in the interior temperature and the target evaporation temperature in each of the refrigeration apparatus according to the embodiment of the present invention and the conventional refrigeration apparatus.

The following description is made with respect to a comparison between the refrigeration apparatus 10 according to the embodiment and a conventional refrigeration apparatus 100, which as described in, for example, patent literature 1, calculates the target evaporation temperature based on the difference between the interior temperature and the target interior temperature. First of all, the configuration of the conventional refrigeration apparatus 100 will be described with reference to FIGS. 8 and 9. Components of the refrigeration apparatus 100 which are equivalent to those of the refrigeration apparatus 10 according to embodiment will be denoted by the same reference signs, and their explanations will thus be omitted.

As illustrated in FIG. 8, the refrigeration apparatus 100 includes the outdoor unit 1 including the compressor 3, the suction pressure sensor 3a, the condenser 4, and the fan 4a, the indoor unit 2 including the interior temperature sensor 2a, the expansion valve 5, and the evaporator 6, an indoor-unit control device 70 which controls the indoor unit 2, and the outdoor-unit control device 8.

The indoor-unit control device 70 includes the interior-temperature obtaining unit 7A, the target interior temperature setting unit 7B, the thermo-temperature determining unit 7C and a target evaporation temperature calculating unit 70I. The target evaporation temperature calculating unit 70I calculates an interior temperature deviation ΔTa, which is the difference between the interior temperature RT and the target interior temperature RTm, using equation (3) below, and calculates the target evaporation temperature ETm based on the calculated interior temperature deviation ΔTa.

$$\Delta Ta = \text{interior temperature } RT - \text{target interior temperature } RTm \quad \text{Eq. (3)}$$

More specifically, the target evaporation temperature calculating unit 70I regards the difference between an interior temperature and a target interior temperature as an interior load, and executes an update control of the target evaporation temperature ETm as follows.

(1) If (the interior temperature−the target interior temperature)>the first set value, it is determined that the interior load is great with respect to the refrigeration capacity. Thus, the target evaporation temperature ETm is reset to be lowered by, for example, 0.5 degrees C., and the rotation speed of the compressor is raised to raise the cooling capacity.

(2) If (the interior temperature−the target interior temperature)<the second set value, it is determined that the interior load is small with respect to the refrigeration capacity. Thus, the target evaporation temperature ETm is reset to be raised by, for example, 0.5 degrees C., and the rotation speed of the compressor is lowered to lower the cooling capacity.

(3) If the second set value≤(the interior temperature−the target interior temperature)≤the first set value, it is determined the interior load and the refrigeration capacity balance each other, and the target evaporation temperature ETm is kept at the current value.

Subsequently, an update control of the target interior temperature RTm which is to be executed by the target evaporation temperature calculating unit 70I will be described with reference to FIG. 9. The description will be made on the assumption that the first set value is set to 2 degrees C., and the second set value is set to 0 degrees C.

First, the target evaporation temperature calculating unit 70I calculates the interior temperature deviation ΔTa, which is the difference between the interior temperature RT and the target interior temperature RTm, using equation (3) described above (FIG. 9: step S201).

Next, in step S202 and step S205, the target evaporation temperature calculating unit 70I evaluates the interior temperature deviation ΔTa based on the first set value, which is 2 degrees C. To be more specific, if the interior temperature deviation ΔTa is greater than 2 degrees C., the target evaporation temperature calculating unit 70I determines that the interior load is great with respect to the refrigeration capacity, and changes the target evaporation temperature ETm by lowering it by 0.5 degrees C. (step S203 in FIG. 9). Then, the target evaporation temperature calculating unit 70I transmits information indicating the changed target evaporation temperature ETm to the outdoor-unit-operation controller 8C, to thereby urge the outdoor-unit-operation controller 8C to raise the cooling capacity (step S204 in FIG. 7).

If the interior temperature deviation ΔTa is smaller than or equal to 2 degrees C. (No in step S202 in FIG. 9) and less than the second set value of 0 degrees C. (Yes in step S205 in FIG. 9), the target evaporation temperature calculating unit 70I determines that the interior load is small with respect to the refrigeration capacity, and changes the target evaporation temperature ETm by lowering it by, for example, 0.5 degrees C. (step S206 in FIG. 9). Then, the target evaporation temperature calculating unit 70I transmits information indicating the changed target evaporation temperature ETm to the outdoor-unit-operation controller 8C, to thereby urge the outdoor-unit-operation controller 8C to raise the cooling capacity (step S204 in FIG. 7).

Furthermore, if the interior temperature deviation ΔTa is greater than or equal to 0 degrees C., that is, "0 degrees C.≤ΔTa≤2 degrees C." (No in step S205 in FIG. 9), the target evaporation temperature calculating unit 70I determines that the refrigeration capacity and the interior load balance each other, and keeps the target evaporation temperature ETm at the current value (step S207 in FIG. 9).

In such a manner, in a conventional control method, i.e., a control method of related art, the target evaporation temperature ETm is constantly updated regardless of the operational condition and the operational state. Thus, if the interior temperature RT is high as in a situation immediately after switching from the thermo-off state to the thermo-on state or immediately after the defrost operation, the frequency with which it is determined that the interior load is great and step S203 is carried out increases, and as a result the target evaporation temperature ETm is lowered more than necessary. In the conventional refrigeration apparatus 100, as the target evaporation temperature ETm is lowered, the cooling capacity is raised, and thus the time required until the thermos-off state is entered is shortened. Therefore, the frequency with which step 206 is carried out decreases, and the thermo-off state is entered before the target evaporation temperature ETm is raised to an optimal value. That is, in the conventional refrigeration apparatus 100, as a result of the above control, the target evaporation temperature ETm tends to be set to a rather lower value. Accordingly, the operation frequency of the compressor 3 and the rotation speed of the fan 4a are raised, as a result of which the power consumption is increased.

Furthermore, the conventional control method in which the target evaporation temperature ETm is constantly updated regardless of the operational condition and the operational state has also the following problem. Even in the case where the refrigeration capacity is not sufficient, and the current target evaporation temperature ETm is required to be maintained, if the interior temperature RT is lowered, step S206 is carried out, and the target evaporation temperature ETm is raised. Thus, the refrigeration capacity is not sufficient. That is, in the conventional refrigeration apparatus 100, even in the case where the interior load is high, and it is required to temporarily cool up the interior, the operation frequency of the compressor 3 is not sufficiently raised.

Next, with respect to the update control of the target evaporation temperature ETm, the difference between the conventional refrigeration apparatus 100 and the refrigeration apparatus 10 according to the present embodiment will be described with reference to FIGS. 10 and 11 and by referring to reference to FIGS. 7 and 9 as appropriate. In the following, an update control of the target evaporation temperature ETm is also simply referred to as "update control".

In FIGS. 10 and 11, the horizontal axis represents "time", the upper side of the vertical axis represents "interior temperature RT", and the lower side of the vertical axis represents "target evaporation temperature ETm". Referring to FIGS. 10 and 11, it is assumed which the thermos-on state is entered at time T1. Furthermore, the conventional refrigeration apparatus 100 and the refrigeration apparatus 10 according to the present embodiment differ from each other in update control, and thus also differ from each other in the time at which the interior temperature RT reaches 2 degrees C., the time at which the interior temperature RT reaches 0 degrees C., and the time at which the interior temperature RT reaches the thermo-off temperature. However, in order to clarify the difference in control between the conventional refrigeration apparatus 100 and the refrigeration apparatus 10 according to present embodiment, the following description referring to FIGS. 10 and 11 is made on the assumption that the above times of the refrigeration apparatus 100 are the same as those of the refrigeration apparatus 10 according to the present embodiment.

Also, in order to clarify the difference between the update control of the conventional refrigeration apparatus 100 and that of the refrigeration apparatus 10 according to the present embodiment, it is assumed that the lowering threshold RTH1 is set according to equation (1) mentioned above, and the threshold setting coefficient and the first set value are set to 2 degrees C. It is also assumed that the raising threshold RTH2 is set according to equation (2) mentioned above, and the second set value is set to 0 degrees C. Likewise, it is assumed that the subtraction coefficient α and the addition coefficient β are set to 0.5 degrees C.

First of all, with reference to FIG. 10, an explanation will be given with respect to the case where the intermediate-temperature duration time measured by the temperature duration time measuring unit 7F is less than the load determination reference time.

In the conventional update control, from time T1 to time T2, ΔTa>2 degrees C. (Yes in step S202 in FIG. 9), and the target evaporation temperature ETm is thus lowered by 0.5 degrees C. (step S203 in FIG. 9).

By contrast, in the update control according to the present embodiment, from time T1 to time T2, RT>RTH1 (Yes in step S101 in FIG. 7) and TI1<TM1 (No in step S102 in FIG. 7), and the current target evaporation temperature ETm is thus maintained.

From time T2 to time T3, in the conventional update control, ΔTa>2 degrees C. (Yes in step S202 in FIG. 9), and in the update control according to the present embodiment, RT>RTH1 (Yes in step S101 in FIG. 7) and TI1≥TM1 (Yes in step S102 in FIG. 7). Therefore, in both these update controls, the target evaporation temperature ETm is lowered by 0.5 degrees C. (step S203 in FIG. 9 and step S105 in FIG. 7).

From time T3 to time T4, in the conventional update control, 0 degrees C.≤ΔTa≤2 degrees C. (No in step S202 in FIG. 9 and No in step S205 in FIG. 9), and in the update control according to the present embodiment, RTH2≤RT≤RTH1 (No in step S101 in FIG. 7 and No at step S107 in FIG. 7). Therefore, in both the update controls, the current target evaporation temperature ETm is maintained.

From time T4 to time T5, in the conventional update control, ΔTa<0 degrees C. (No in step S202 in FIG. 9 and Yes in step S205), and in the update control according to the present embodiment, RT<RTH2 (No in step S101 in FIG. 7 and Yes in step S107 in FIG. 7) and TI2<TM2 (Yes in step S108 in FIG. 7). Therefore, in both the update controls, the target evaporation temperature ETm is raised by 0.5 degrees C. (step S206 in FIG. 9 and step S112 in FIG. 7).

From time T5 onward, that is, after the thermo-off state is entered, in both the update controls, the current target evaporation temperature ETm is maintained.

Next, with reference to FIG. 11, an explanation will be given with respect to the case where the intermediate-temperature duration time measured by the temperature duration time measuring unit 7F is greater than or equal to the load determination reference time. The processes up to that at time T4 are the same as described above with reference to FIG. 10, and their explanations will thus be omitted.

From time T4 to time T5, in the conventional control, ΔTa<0 degrees C. (No in step S202 in FIG. 9 and Yes in step S205 in FIG. 9), and until the thermos-off state is entered, the target evaporation temperature ETm is raised by 0.5 degrees C. at intervals of 60 seconds (step S206 in FIG. 9).

By contrast, in the update control according to the present embodiment, RT<RTH2 (No in step S101 in FIG. 7 and Yes in step S107) and TI2≥TM2 (No in step S108 in FIG. 7). Therefore, the current target evaporation temperature ETm is maintained.

From time T5 onward, that is, after the thermo-off state is entered, in both the update controls, the current target evaporation temperature ETm is maintained.

As illustrated in FIGS. 10 and 11, in the update control according to the present embodiment, the target evaporation temperature ETm is higher by 0.5 degrees C. than that in the conventional update control, and the update control according to the present embodiment prevents the target evaporation temperature ETm from being unnecessarily lowered. That is, in the conventional update control, the target evaporation temperature ETm is lowered immediately after the thermos-on state is entered, and thus the target evaporation temperature ETm is set to a lower value than that in the update control according to the present embodiment, in which the target evaporation temperature ETm is lowered after the set time Mt elapses from the time the thermos-on state is entered. In other words, the update control according to the present embodiment can prevent the target evaporation temperature ETm from being unnecessarily lowered.

In the update control according to the present embodiment, the target evaporation temperature ETm is lower than that in the conventional update control by 1.0 degrees C., to thereby prevent the target evaporation temperature ETm from being unnecessarily raised. To be more specific, in the update control by the conventional refrigeration apparatus 100, the target evaporation temperature ETm is updated constantly regardless of the operational condition and the operational state. Thus, in the case where the refrigeration capacity is not sufficient and it is required to maintain the current target evaporation temperature ETm, if the interior temperature RT is lowered, the target evaporation temperature ETm is unnecessarily raised, and the cooling capacity becomes insufficient. In this regard, in the update control according to the present embodiment, the target evaporation temperature ETm is raised only when the target evaporation temperature calculating unit 7I can determine that the refrigeration capacity is sufficient. Thus, it is possible to prevent the target evaporation temperature ETm from being unnecessarily raised, for example, in the case where the refrigeration capacity is not sufficient even through the interior temperature RT is low, and thus prevent shortage of the cooling capacity.

As described above, in the refrigeration apparatus 10 according to the present embodiment, in calculation of the target evaporation temperature ETm, if the interior temperature RT is higher than the lowering threshold RTH1, and then if the high-temperature duration time TI1 is less than the update reference time TM1, the refrigeration apparatus 10 does not determine that the cooling capacity is low with respect to the interior load, and maintains the current the target evaporation temperature ETm. In other words, after a time lag from the time the thermo-on state is entered, the refrigeration apparatus 10 lowers the target evaporation temperature ETm if the high-temperature duration time TI1 is greater than or equal to the update reference time TM1, and the refrigeration apparatus 10 does not lower the target evaporation temperature ETm if the high-temperature duration time TI1 is less than the update reference time TM1. It is therefore possible to prevent the target evaporation temperature ETm from being unnecessarily lowered, thus reducing the power consumption.

Furthermore, in calculation of the target evaporation temperature ETm, if the interior temperature RT is lower than the raising threshold RTH2, and then if the time required until the interior temperature RT changes from the lowering threshold RTH1 to the raising threshold RTH2 is not less than the load determination reference time TM2, the refrigeration apparatus 10 does not determine that the cooling capacity is high with respect to the interior load, and does not raise the target evaporation temperature ETm. Therefore, the refrigeration apparatus 10 can prevent the target evaporation temperature ETm from being unnecessarily excessively raised, and also prevent shortage of the cooling capacity.

The above embodiment is described above as preferred concrete examples of a refrigeration apparatus and a method for controlling the refrigeration apparatus, and the technical scope of the present invention is not limited to the examples of the embodiment. For example, although the foregoing description of the embodiment is made by referring to by way of example the case where the subtraction coefficient α and the addition coefficient β are each set to a constant, this is not limitative, that is, other cases are applicable. In setting of the subtraction coefficient α, the target evaporation temperature calculating unit 7I may lower the subtraction coefficient α as the interior temperature RT changes closer to the target interior temperature RTm. Even in this case, when the interior temperature RT becomes closer to the target interior temperature RTm, it is possible to determine that the cooling capacity is not insufficient, and thus reduce the power consumption while ensuring a necessary and sufficient cooling capacity. Furthermore, in setting of the addition coefficient β, the target evaporation temperature calculating unit 7I may raise the addition coefficient β as the interior temperature RT changes to further greatly differ from the target interior temperature RTm. When the interior temperature RT changes to further greatly differ from the target interior temperature RTm, the interior temperature RT is sufficiently lowered. Therefore, by virtue of the above setting, it is possible to prevent excessive cooling of the interior space, etc., and also reduce the power consumption.

Specifically, for example, a subtraction adjustment threshold, which is a temperature between the thermo-on temperature and the lowering threshold RTH1, may be stored in advance in the internal memory or another storage. Then, when measurement of the set time Mt is ended, if the interior temperature RT is below the subtraction adjustment threshold, the target evaporation temperature calculating unit 7I may update the subtraction coefficient α by subtracting a preset adjustment coefficient p from the subtraction coefficient α. A plurality of subtraction adjustment thresholds may be set, and adjustment coefficients p may also be set in accordance with the thresholds, respectively.

Likewise, for example, an addition adjustment threshold, which is a temperature between the raising threshold RTH2 and the thermo-off temperature, may be stored in advance in the internal memory or another storage. Then, when measurement of the set time Mt is ended, if the interior temperature RT is below the addition adjustment threshold, the target evaporation temperature calculating unit 7I may update the addition coefficient β by adding a preset adjustment coefficient q to the addition coefficient β. A plurality of addition adjustment thresholds may be set, and adjustment coefficients q may also be set in accordance with the thresholds, respectively.

Furthermore, for example, the target evaporation temperature calculating unit 7I may change the subtraction coefficient α or the addition coefficient β in accordance with the difference ΔTa between the interior temperature RT and the target interior temperature RTm. In the case where such a configuration is employed, a difference-coefficient table, which associates differences ΔTa between interior temperatures RT and target interior temperatures RTm with subtraction coefficients α or addition coefficients β, may be stored in advance in the internal memory or another storage. Furthermore, it may be set that the target evaporation temperature calculating unit 7I calculates the difference ΔTa between the interior temperature RT and the target interior temperature RTm, and with respect to the calculated difference ΔTa, the target evaporation temperature calculating unit 7I refers to the difference-coefficient table to set an associated subtraction coefficient α or an associated addition coefficient β.

In addition, for example, the target evaporation temperature calculating unit 7I may change the subtraction coefficient α in accordance with the number of times which the set time Mt is measured after the elapse of the update reference time TM1, that is, in accordance with the number of updates. The target evaporation temperature calculating unit 7I may set the subtraction coefficient α in such a way as to decrease the subtraction coefficient α as the number of updates increases. Alternatively, for example, the target evaporation temperature calculating unit 7I may set the same subtraction coefficient α for the first update and the second update, and set a smaller subtraction coefficient α than that for the first and second updates, for updates from the third update onward. In such a manner, the target evaporation temperature calculating unit 7I may set subtraction coefficients α in accordance with the number of updates and apply the same subtraction coefficient α for some updates.

Likewise, the target evaporation temperature calculating unit 7I may change the addition coefficient β in accordance with the number of times which the set time Mt is measured after the interior temperature RT reaches the raising threshold RTH2, that is, the number of updates. The target evaporation temperature calculating unit 7I may set the addition coefficient β such that the addition coefficient β becomes greater as the number of measurements increases. Also, the target evaporation temperature calculating unit 7I may set addition coefficients β in accordance with the number of updates and apply the same subtraction coefficient α for some updates.

In the case where such a configuration is employed, it may be set that a count-coefficient table, which associates update counts each representing the number of updates with subtraction coefficients α or addition coefficients β, is stored in the internal memory or another storage in advance, and with respect to a given update count, the target evaporation temperature calculating unit 7I refers to the count-coefficient table to set an associated subtraction coefficient α or addition coefficient β.

Although in the above explanation of the present embodiment, "2 degrees C." is described as an example of the threshold setting coefficient to be added to the target interior temperature RTm when the lowering threshold setting unit 7D sets the lowering threshold RTH1, it is not limitative, that is, the threshold setting coefficient can be changed as appropriate in accordance with, for example, the target interior temperature RTm. Although the above explanation of equation (2) is given by referring to by way of example the case where the raising threshold setting unit 7E sets the raising threshold RTH2 to a temperature equal to the target interior temperature RTm, this is not limitative, that is, the raising threshold setting unit 7E may determine the raising threshold RTH2 by adding a predetermined temperature to the target interior temperature RTm, or may determine the raising threshold RTH2 by subtracting a predetermined temperature from the target interior temperature RTm. In other words, it suffices that the lowering threshold RTH1 and the raising threshold RTH2 are set such that the lowering threshold RTH1 is higher than the thermo-on temperature, the raising threshold RTH2 is higher than the thermo-off temperature, and the relationship "RTH1>RTH2" is satisfied.

Furthermore, although the above description of the present embodiment is made by referring to by way of example the case where the set time Mt is set to three to five minutes, and the update reference time TM1 is set to 10 to 15 minutes, this is not limitative, that is, for example, in accordance with the characteristics of the refrigeration apparatus 10, the set time Mt may be set to time shorter than three minutes or longer than five minutes, or the update reference time TM1 may be set to time shorter than 10 minutes or longer than 15 minutes. Also, the set time Mt and the update reference time TM1 may be set equal to each other.

The invention claimed is:

1. A refrigeration apparatus including a refrigerant circuit formed by connecting a compressor, a condenser, an expansion valve and an evaporator with refrigerant pipes, the refrigeration apparatus comprising:
a target evaporation temperature calculating unit configured to calculate and update a target evaporation temperature, the target evaporation temperature being a temperature which a temperature of the evaporator is to be made to reach; and
a temperature duration time measuring unit configured to measure a high-temperature duration time in a thermo-on state, the high-temperature duration time being time during which a temperature of an interior of a to-be-cooled space is higher than a lowering threshold which is set with reference to a target interior temperature, the to-be-cooled space being space to be cooled,
wherein the target evaporation temperature calculating unit updates the target evaporation temperature by lowering the target evaporation temperature by a set subtraction coefficient, after the high-temperature duration time measured by the temperature duration time measuring unit becomes greater than or equal to an update reference time.

2. The refrigeration apparatus of claim 1,
wherein the target evaporation temperature calculating unit keeps the target evaporation temperature at a current value if the high-temperature duration time measured by the temperature duration time measuring unit is less than the update reference time.

3. The refrigeration apparatus of claim 1,
wherein the target evaporation temperature calculating unit updates the target evaporation temperature by lowering the target evaporation temperature by the subtraction coefficient, each time a set time elapses while the temperature duration time measuring unit is measuring the high-temperature duration time.

4. The refrigeration apparatus of claim 1,
wherein the target evaporation temperature calculating unit sets the subtraction coefficient by decreasing the subtraction coefficient, when the temperature of the interior of the to-be-cooled space changes closer to the target interior temperature.

5. The refrigeration apparatus of claim 1,
wherein the temperature duration time measuring unit has a function of measuring an intermediate-temperature duration time, the intermediate-temperature duration time being time required until the temperature of the interior of the to-be-cooled space lowers from the lowering threshold to a raising threshold which is set lower than the lowering threshold, and
wherein the evaporation temperature calculating unit updates, if the intermediate-temperature duration time measured by the temperature duration time measuring unit is less than a load determination reference time, the target evaporation temperature by raising the target evaporation temperature by a set addition coefficient, until the temperature of the interior of the to-be-cooled space reaches a thermo-off temperature after reaching the raising threshold.

6. The refrigeration apparatus of claim 5,
wherein the target evaporation temperature calculating unit keeps the target evaporation temperature at a current value if the intermediate-temperature duration time measured by the temperature duration time measuring unit is greater than or equal to the load determination reference time.

7. The refrigeration apparatus of claim 5,
wherein the target evaporation temperature calculating unit does not perform updating to lower the target evaporation temperature, while the temperature duration time measuring unit is measuring the intermediate-temperature duration time.

8. The refrigeration apparatus of claim 5,
wherein the target evaporation temperature calculating unit sets the addition coefficient by increasing the addition coefficient, when the temperature of the interior of the to-be-cooled space changes to further differ from the target interior temperature.

9. The refrigeration apparatus of claim 5,
wherein the raising threshold is set to a temperature less than or equal to the target interior temperature.

10. The refrigeration apparatus of claim 1,
wherein the lowering threshold is set to a temperature higher than the target interior temperature.

11. A method for controlling a refrigeration apparatus, the refrigeration apparatus including a refrigerant circuit formed by connecting a compressor, a condenser, an expansion valve, and an evaporator with refrigerant pipes, the method comprising causing a controller configured to control operation of the refrigeration apparatus to execute:
measurement of a high-temperature duration time in a thermo-on state, the high-temperature duration time being time during which a temperature of an interior of a to-be-cooled space is higher than a lowering threshold which is set with reference to a target interior temperature, the to-be-cooled space being space to be cooled; and updating of a target evaporation temperature by lowering the target evaporation temperature by a set subtraction coefficient, after the measured high-temperature duration time becomes greater than or equal to an update reference time, the target evaporation temperature being a temperature which a temperature of the evaporator is to be made to reach.

* * * * *